(12) United States Patent
Li et al.

(10) Patent No.: US 12,197,489 B2
(45) Date of Patent: Jan. 14, 2025

(54) METHOD AND APPARATUS FOR SEARCHING FOR CLIPPING TEMPLATE

(71) Applicant: BEIJING ZITIAO NETWORK TECHNOLOGY CO., LTD., Beijing (CN)

(72) Inventors: Gen Li, Beijing (CN); Yingzhi Zhou, Beijing (CN); Ran Cui, Beijing (CN); Ying Zhang, Beijing (CN)

(73) Assignee: BEIJING ZITIAO NETWORK TECHNOLOGY CO, LTD., Beijing (CN)

( * ) Notice: Subject to any disclaimer, the term of this patent is extended or adjusted under 35 U.S.C. 154(b) by 0 days.

(21) Appl. No.: 18/484,933

(22) Filed: Oct. 11, 2023

(65) Prior Publication Data

US 2024/0037134 A1 Feb. 1, 2024

Related U.S. Application Data

(63) Continuation of application No. PCT/CN2022/090348, filed on Apr. 29, 2022.

(30) Foreign Application Priority Data

Apr. 30, 2021 (CN) .......................... 202110485269.3

(51) Int. Cl.
*G06F 16/435* (2019.01)
*G06F 16/438* (2019.01)

(52) U.S. Cl.
CPC .......... *G06F 16/435* (2019.01); *G06F 16/438* (2019.01)

(58) Field of Classification Search
CPC ........ G06F 16/40; G06F 16/43; G06F 16/432; G06F 16/433; G06F 16/434;
(Continued)

(56) References Cited

U.S. PATENT DOCUMENTS 6,954,894 B1    10/2005  Balnaves et al.
7,921,156 B1 *   4/2011  Stolorz .................. H04L 51/52
                                                  709/201

(Continued)

FOREIGN PATENT DOCUMENTS

CN      109255053 A     1/2019
CN      109299445 A     2/2019
(Continued)

OTHER PUBLICATIONS

International Search Report (with English translation) and Written Opinion issued in PCT/CN2022/090348, dated Jun. 27, 2022, 14 pages provided.

(Continued)

*Primary Examiner* — Alicia M Willoughby
*Assistant Examiner* — Cheryl M Shechtman
(74) *Attorney, Agent, or Firm* — Astute IP Law Group

(57) ABSTRACT

A method for searching for a clipping template includes: in a video editing scenario, a server device acquires a first multimedia resource specified by a user and carries out searching according to the first multimedia resource specified by the user, to obtain a target clipping template matching the first multimedia resource, the target clipping template being used to indicate that multimedia material to be clipped is clipped, on the basis of a target clipping method, into a second multimedia resource.

11 Claims, 16 Drawing Sheets

A target audio file specified by a user is acquired — S401

The candidate clipping template is determined based on the features of the target audio file and at least one clipping template in the target dimension — S402'

The search result is acquired based on an identification result of a candidate clipping template in a target dimension, where the identification result of the candidate clipping template in the target dimension is obtained based on features of the target audio file and the candidate clipping template in the target dimension — S402

(58) Field of Classification Search
CPC .. G06F 16/435; G06F 16/438; G06F 16/4387; G06F 16/4393; G06F 16/45; G06F 16/48; G06F 16/483; G06F 16/487; G06F 16/489
See application file for complete search history.

(56) References Cited

U.S. PATENT DOCUMENTS

| | | | |
|---|---|---|---|
| 2009/0254565 | A1 | 10/2009 | Fesen |
| 2018/0173381 | A1* | 6/2018 | Bakker ............... G06F 16/9535 |
| 2019/0042574 | A1* | 2/2019 | Kim ..................... G06F 18/41 |
| 2021/0005223 | A1 | 1/2021 | Wang et al. |
| 2021/0326535 | A1* | 10/2021 | Liu ..................... G06F 16/2465 |
| 2022/0044026 | A1* | 2/2022 | Huang ................. G11B 27/034 |
| 2023/0057566 | A1 | 2/2023 | Huang et al. |
| 2023/0093621 | A1* | 3/2023 | Wu ..................... G06F 16/434 707/722 |
| 2023/0099963 | A1* | 3/2023 | O'Neill ................. G06F 40/279 707/722 |
| 2023/0127373 | A1 | 4/2023 | Wang |
| 2024/0028634 | A1* | 1/2024 | Liang .................. H04N 21/854 |

FOREIGN PATENT DOCUMENTS

| | | |
|---|---|---|
| CN | 110139159 A | 8/2019 |
| CN | 110177219 A | 8/2019 |
| CN | 110536177 A | 12/2019 |
| CN | 111105819 A | 5/2020 |
| CN | 111243632 A | 6/2020 |
| CN | 111460183 A | 7/2020 |
| CN | 111541936 A | 8/2020 |
| CN | 111741331 A | 10/2020 |
| CN | 111835986 A | 10/2020 |
| CN | 111914523 A | 11/2020 |
| CN | 111930994 A | 11/2020 |
| CN | 112203140 A | 1/2021 |
| CN | 112449231 A | 3/2021 |
| CN | 112711937 A | 4/2021 |
| CN | 113840099 A | 12/2021 |
| JP | 2008225379 A | 9/2008 |
| JP | 2016081265 A | 5/2016 |

OTHER PUBLICATIONS

Office Action issued in Chinese Application No. 202110485269.3, dated Nov. 9, 2023, with English translation.
Office Action issued in Chinese Application No. 202110485269.3, dated Mar. 12, 2024, with English translation.
The extended European search report issued in European Application No. 22795026.8, dated Jul. 16, 2024.
Notice of Reasons for Refusal for Japanese Patent Application No. 2023-566920, mailed Nov. 5, 2024, 8 pages.

* cited by examiner

METHOD AND APPARATUS FOR SEARCHING FOR CLIPPING TEMPLATE

This application is a continuation of International Application No. PCT/CN2022/090348, filed on Apr. 29, 2022 which claims priority to Chinese Patent Application No. 202110485269.3, titled "METHOD AND APPARATUS FOR SEARCHING FOR CLIPPING TEMPLATE", filed on Apr. 30, 2021 with the China National Intellectual Property Administration, both of which are incorporated herein by reference in their entireties.

FIELD

The present disclosure relates to Internet technology field, and in particular to a method and apparatus for searching for a clipping template.

BACKGROUND

With the development of the Internet technologies, users often choose application (APP) to create videos. The application usually provides enriched clipping templates. The users can use the clipping templates and select their favorite photos or videos to obtain synthesized videos. However, it is an urgent problem to be solved how to quickly and accurately find the clipping template the user desired.

SUMMARY

In order to solve or at least partly solve the above technical problems, a method and apparatus for searching for a clipping template are provided according to embodiments of the present disclosure.

In a first aspect, a method for searching for a clipping template is provided according to an embodiment of the present disclosure. The method includes:
  acquiring a first multimedia resource determined by a user; and
  performing a search based on the first multimedia resource, to acquire a search result,
  where the search result is configured to indicate whether a target clipping template matching the first multimedia resource is searched out, and the target clipping template is configured to indicate to clip a to-be-clipped multimedia material into a second multimedia resource based on a target clipping mode, and the target clipping mode is a clipping mode used in the first multimedia resource.

In some optional implementations, the performing a search based on the first multimedia resource, to acquire a search result includes:
  acquiring the search result, based on an identification result of a candidate clipping template in a target dimension, where the identification result of the candidate clipping template in the target dimension is obtained based on features of the first multimedia resource and the candidate clipping template in the target dimension.

In some optional implementations, before the acquiring the search result, based on an identification result of a candidate clipping template in a target dimension, the method further includes:
  determining the candidate clipping template, based on a feature of the first multimedia resource in the target dimension and a feature of at least one clipping template in the target dimension, where the at least one clipping template includes the candidate clipping template.

In some optional implementations, the target dimension includes: one or more of a music style dimension, an audio fingerprinting dimension, a video size dimension, a video segment feature dimension, and a visual effect dimension.

In some optional implementations, the target dimension includes: at least two of the music style dimension, the audio fingerprinting dimension, the video size dimension, the video segment feature dimension, and the visual effect dimension.

The acquiring the search result, based on an identification result of a candidate clipping template in a target dimension includes:
  acquiring a weighted calculation result for the candidate clipping template, based on identification results of the candidate clipping template in respective target dimensions and weight coefficients corresponding to the respective target dimensions; and
  acquiring the search result, based on the weighted calculation result for the candidate clipping template.

In some optional implementations, the determining the candidate clipping template, based on a feature of the first multimedia resource in the target dimension and a feature of at least one clipping template in the target dimension includes:
  determining a current dimension, based on a priority order of respective target dimensions;
  acquiring a first identification result for each clipping template in a first filtering result in the current dimension, based on a feature of the first multimedia resource in the current dimension and a feature of the first filtering result in the current dimension;
  acquiring a second filtering result corresponding to the current dimension, based on the first identification results and a filtering condition corresponding to the current dimension; where the second filtering result includes: one or more clipping templates, and the first filtering result in an initial state includes: the at least one clipping template;
  determining the second filtering result as the first filtering result; and
  returning to a process of determining a current dimension based on the priority order of the respective target dimensions, until a second filtering result corresponding to a last current dimension is acquired; and determining a clipping template included in the second filtering result corresponding to the last current dimension as the candidate clipping template.

In some optional implementations, the acquiring a first multimedia resource determined by a user includes: acquiring a target link inputted by the user, and parsing the target link to acquire the first multimedia resource.

In some optional implementations, the method further includes: sending the search result to the user.

In a second aspect, an apparatus for searching for a clipping template searching is provided according to an embodiment of the present disclosure. The apparatus includes: an acquisition module and a search module.

The acquisition module is configured to acquire a first multimedia resource determined by a user.

The search module is configured to perform a search to acquire a search result, based on the first multimedia resource, where the search result is configured to indicate whether a target clipping template matching the first multimedia resource is searched out, and the target clipping template is configured to indicate to clip a to-be-clipped multimedia material into a second multimedia resource in a target clipping mode, and the target clipping mode is a clipping mode used in the first multimedia resource.

In a third aspect, an electronic device is provided according to the present disclosure, the electronic device includes a memory; a processor; and a computer program. The memory is configured to store the computer program. The processor is configured to execute the computer program to implement the method for searching for the clipping template according to any one embodiment of the first aspect.

In a fourth aspect, a readable storage medium is provided according to the present disclosure. The readable storage medium includes a program. The program, when executed by at least one processor of the electronic device, implements the method for searching for the clipping template according to any one embodiment of the first aspect.

In a fifth aspect, a program product is provided according to the present disclosure. The program product includes: a computer program stored in a readable storage medium. At least one processor of an electronic device is configured to read the computer program from the readable storage medium, and execute the computer program to cause the electronic device to implement the method for searching for the clipping template according to any one embodiment of the first aspect.

A method and apparatus for searching for a clipping template are provided according to embodiments of the present disclosure. In the method, in a video editing scenario, the server device can acquire first multimedia resource specified by the user, and perform a search based on the first multimedia resource specified by the user, to obtain a target clipping template matching the first multimedia resource. The target clipping template is used to indicate to clip the to-be-clipped multimedia material into a second multimedia resource in a target clipping method. In this solution, the search is performed based on the first multimedia resource, which improves the accuracy of the search result, satisfies the requirements of the user for video creation, and improves the utilization rate of the target clipping template.

BRIEF DESCRIPTION OF THE DRAWINGS

The drawings herein are incorporated into the specification and constitute a part of the specification, which show embodiments that comply with the present disclosure. The drawings and the specification are used as a whole to explain the principle of the present disclosure.

In order to more clearly illustrate the embodiments of the present disclosure or the technical solutions in the conventional technology, the drawings used in the description of the embodiments or the conventional technology are briefly introduced below. It is apparent that, for those skilled in the art, other drawings can be obtained according to the provided drawings without any creative effort.

DETAILED DESCRIPTION OF EMBODIMENTS

In order to understand the above purposes, features, and advantage of the present disclosure more clearly, the technical solutions according to the present disclosure will be further described. It should be noted that the embodiments of the present disclosure and the features in the embodiments may be combined with each other if there is no conflict.

In the following description, numerous specific details are set forth in order to provide thorough understanding of the present disclosure. However, the present disclosure may also be implemented in other ways different from those described here. Obviously, the embodiments in the specification are only a part of the embodiments of the present disclosure, rather than all the embodiments.

When the user uses an APP to create a video, the existing APP usually supports searching for clipping templates through keywords. However, in some cases, the user cannot obtain the correct keyword, and the clipping template found out through the keyword inputted by the user is not the clipping template the user desired, which may reduce user enthusiasm for creating the video.

Based on this, a method for searching for a clipping template is provided according to the present disclosure. The core concept of the method is to acquire the first multimedia resource specified by the user, and then analyze the first multimedia resource and candidate clipping templates, to determine a target clipping template the user desired from the candidate clipping templates fast and accurately, which can improve the accuracy of the search results, meet the requirements of the user for video creation, and increase the utilization rate of the target clipping template.

Figure 1:
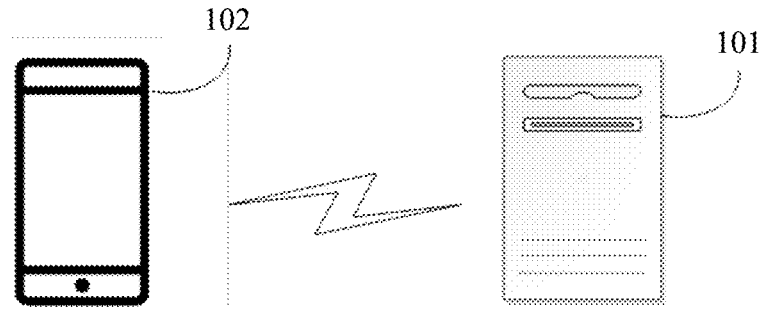
FIG. 1 is a schematic diagram of an application scenario of a method for searching for a clipping template according to an embodiment of the present disclosure.

FIG. 1 is a schematic diagram of an application scenario of a method for searching for a clipping template according to an embodiment of the present disclosure. The method for searching for the clipping template provided in this embodiment may be applied to the scenario as shown in FIG. 1. Referring to FIG. 1, this scenario includes: a server device 101 and a terminal device 102. The server device 101 and the terminal device 102 may be connected through a wired or wireless network.

The server device 101 may be implemented by any software and/or hardware. For example, the server device 101 may be a server. The server may be an independent server, or a server cluster composed of multiple independent servers, or may be a cloud server. The server device 101 may also be a software program integrated in the electronic device. The software program, when executed by at least one processor of the electronic device, may implement the technical solutions performed by the server device in the method for searching for the clipping template according to the embodiments of the present disclosure. In practical applications, the server device may interact with one or more terminal devices simultaneously, to send the same or different data to the terminal devices.

The terminal device 102 may be implemented in any software and/or hardware manner. For example, the terminal device 102 may include, but be not limited to, a notebook computer, a desktop computer, a smart phone, a portable terminal device, a wearable device, a personal digital assistant (PDA) and other device. The specific type of the terminal device is not limited in the present disclosure. The terminal device 102 may also be a software program integrated in the electronic device. The software program, when executed by the processor of the electronic device, may implement the technical solutions performed by the terminal device in the method for searching for the clipping template according to the embodiment of the present disclosure.

FIG. 1 exemplarily shows a scenario in which one server device interacts with one terminal device. In practical application scenarios, the server device may interact with more terminal devices in parallel.

A method for searching for a clipping template provided by the present disclosure will be described in detail below through several specific embodiments.

Figure 2:
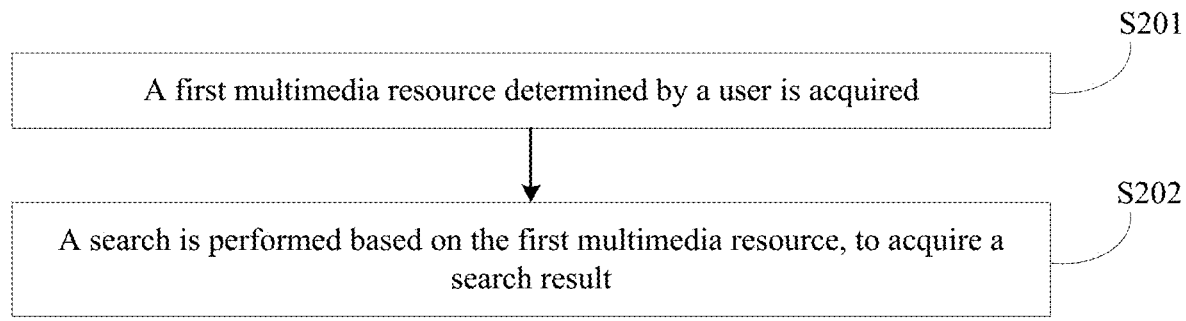
FIG. 2 is a flowchart of a method for searching for a clipping template according to an embodiment of the present disclosure.

FIG. 2 is a flowchart of a method for searching for a clipping template according to an embodiment of the present disclosure. The execution subject of this embodiment may be a server device. Referring to FIG. 2, this embodiment includes step S201 and S202 as follows.

In S201, a first multimedia resource determined by a user is acquired.

In this embodiment, the server device acquires the first multimedia resource specified by the user through the terminal device. The first multimedia resource may be an audio file or a video file.

In an embodiment, the first multimedia resource may be a multimedia resource (e.g., a short video) which is obtained through video creation based on a target clipping template.

In an embodiment, the first multimedia resource may be actively reported by the user through the terminal device. Alternatively, the first multimedia resource may be specified by the user in other ways. For example, the user reports the target link through the terminal device, and the server device obtains the first multimedia resource by parsing the target link.

It is assumed that multiple applications are installed on the terminal device, and the multiple applications include: a video clipping application and other applications.

In an embodiment, the target link may be copied by the user from any one of the above other applications and pasted into the video clipping application. The above other application programs may include, but be not limited to, a music type application, a video type application, a social type application, and the like.

In an embodiment, the target link may also be manually inputted by the user into the video clipping application installed on the terminal device.

The source of the target link and the manner for acquiring the target link by the terminal device are not limited in the present disclosure.

After the video clipping application obtains the target link, the webpage corresponding to the target link is obtained by parsing the target link, and the uniform resource locator (URL) of the first multimedia resource is obtained from the webpage. The terminal device accesses and downloads the first multimedia resource according to the URL of the first multimedia resource. Then, the terminal device uploads the obtained first multimedia resource to the server device via the established communication link between the terminal device and the server device.

Alternatively, after the video clipping application obtains the target link, the target link may be sent to the server device through the established communication link between the terminal device and the server device. After receiving the target link, the server device acquires the webpage corresponding to the target link by parsing the target link and acquires the URL of the first multimedia resource from the web page. The terminal device accesses and downloads the first multimedia resource according to the URL of the first multimedia resource.

In S202, a search is performed based on the first multimedia resource, to acquire a search result.

The purpose of this step is to search for a target clipping template that uses the same clipping method as the first multimedia resource.

The search result is used to indicate whether a target clipping template matching the first multimedia resource is searched out.

In an optional implementation, based on the first multimedia resource, a search is performed on the template database deployed on the server device, to acquire the search result.

The template database deployed on the server device includes: at least one clipping template. Each clipping template is used to provide a preset clipping mode. The to-be-clipped multimedia material selected or imported by the user may be clipped into a new multimedia resource based on the preset clipping mode provided by the clipping template.

In this embodiment, the server device may obtain the search result, by analyzing the first multimedia resource and the clipping template in the template database in a target dimension. The target dimension may include one or more of a music style dimension, an audio fingerprinting dimension, a video size dimension, a video segment feature dimension and a visual effect dimension.

In an embodiment, a trained search model may be pre-deployed on the server device. After the server device acquires the first multimedia resource specified by the user, the above search may be performed by the trained search model. Alternatively, other modes or algorithms may also be used to perform the above search.

The method for performing the search by the search model may refer to the detailed description hereinafter.

In the method for searching for the clipping template provided in this embodiment, the server device acquires the first multimedia resource specified by the user, and searches the template database based on the first multimedia resource specified by the user to obtain the target clipping template matching the first multimedia resource. In this solution, the search is performed based on the first multimedia resource, which improves the accuracy of the search results, further satisfies the requirement of the user for video creation, and improves the utilization rate of the target clipping template.

Hereinafter, a method for searching for the search model based on the first multimedia resource and clipping templates included in the template database will be respectively described in detail, in two cases where the first multimedia resource is an audio file or a video file.

It should be noted that, in practical applications, the server device that performs the searches and the server device that stores the template database may be the same device or different devices, which is not limited in the embodiment of the present disclosure.

First Case: The First Multimedia Resource is an Audio File

Figure 3:
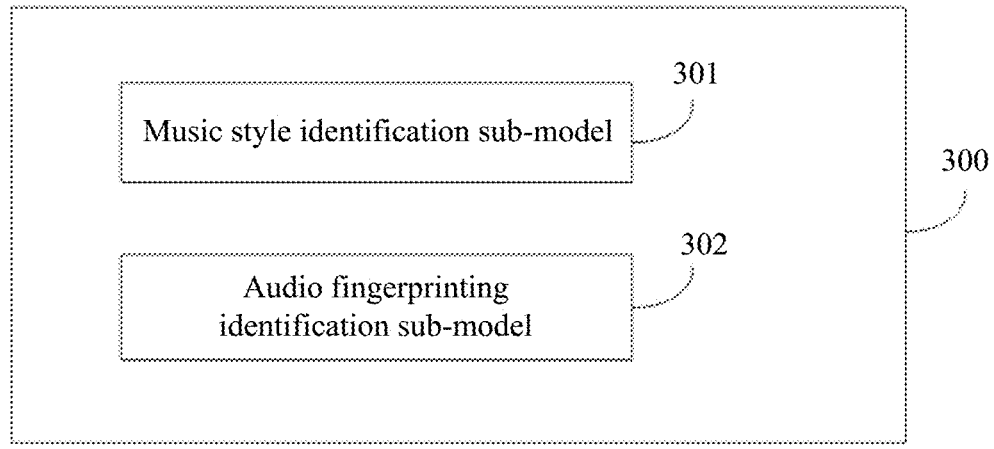
FIG. 3 is a schematic structural diagram of a search model according to an embodiment of the present disclosure.
Figure 4:
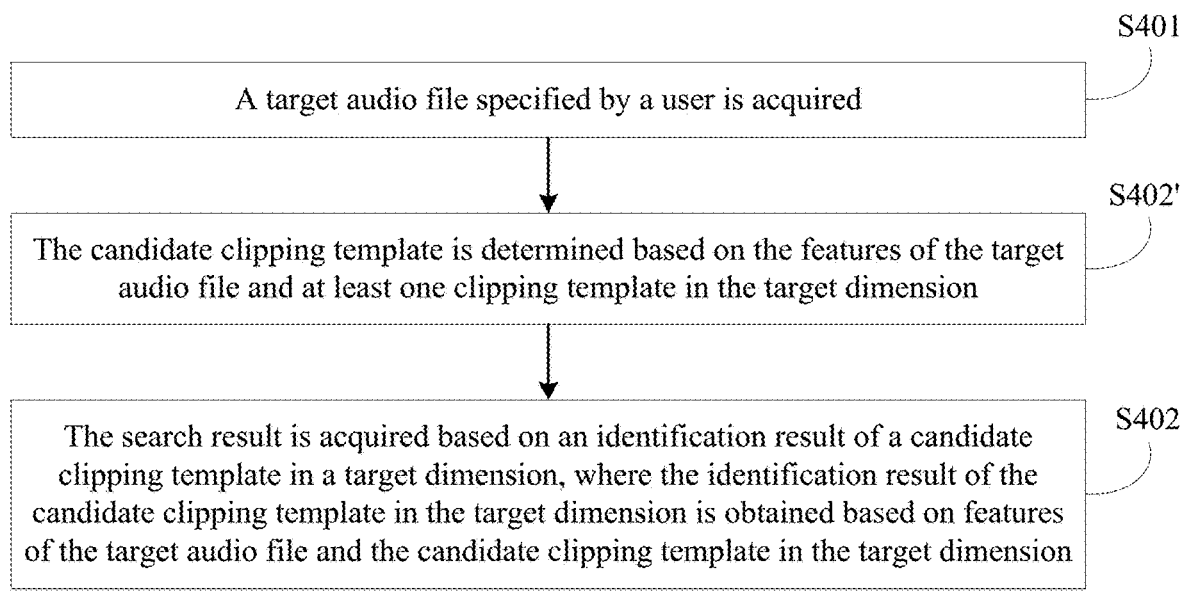
FIG. 4 is a flowchart of a method for searching for a clipping template according to another embodiment of the present disclosure.

FIG. 3 is a schematic structural diagram of a search model according to an embodiment of the present disclosure; and FIG. 4 is a flowchart of a method for searching for a clipping template according to another embodiment of the present disclosure.

Referring to FIG. 3, the search model 300 includes: a music style identification sub-model 301 and an audio fingerprinting identification sub-model 302.

The music style identification sub-model 301 is configured to output first identification results corresponding to the respective clipping templates in the music style dimension, based on the first multimedia resource and the audio files contained in the respective template videos. The first identification results are used to indicate similarities between the music style of the first multimedia resource and those of the audio files contained in the respective template videos.

In this solution, the music style may be divided into multiple types in advance. For example, the music style includes multiple styles such as a sad style, quiet style, popular style, cheerful style, relaxed style, sweet style, happy style, etc. The specific classification of music styles is not limited in the embodiments of the present disclosure.

In an embodiment, for each clipping template included in the template database, the music style identification sub-model 301 is configured to acquire a first feature vector corresponding to the first multimedia resource and a second feature vector for the audio file contained in the clipping template, in a specific algorithm; calculate a distance (e.g., Euclidean distance, or a distance obtained by other algorithms) between the first feature vector and the second feature vector; and acquire the first identification result corresponding to the clipping template based on the calculated distance.

When the first identification result is represented by a music style score, the higher the music style similarity is proportionate to the music style score.

The audio fingerprinting identification sub-model 302 is configured to output second identification results corresponding to the respective clipping templates in the audio fingerprinting dimension, based on the first multimedia resource and the audio files contained in the respective template videos. The second identification results are used to indicate similarities between the audio fingerprinting of the first multimedia resource and that of the audio files contained in the respective template videos.

Specifically, the audio fingerprinting identification sub-model 302 is configured to use audio fingerprinting technology to analyze a multimedia file and audio files included in the respective clipping templates. The audio fingerprinting technology refers to a specific algorithm which is used to extract the data feature of the to-be-identified audio file, such as acoustic spectrum features, sound spectrum features and the like; and compare the data feature of the to-be-identified audio file with an established audio fingerprinting database.

In the case that the second identification result is represented by an audio fingerprinting score, the audio fingerprinting similarity is proportionate to the audio fingerprinting score.

On the basis of using the search model 300 as shown in FIG. 3, combining with FIG. 4, a method for searching for a clipping template provided in an embodiment includes as follows.

In S401, the server device acquires a target audio file.

It should be understood that the target audio file in this embodiment is the first multimedia resource. The specific implementation for the server device acquiring the target audio file may refer to the description in the embodiment as shown in FIG. 2, which will not be repeated here.

In S402, the search result is acquired based on an identification result of a candidate clipping template in a target dimension. The identification result of the candidate clipping template in the target dimension is obtained based on features of the target audio file and the candidate clipping template in the target dimension.

In combination with the search model 300 as shown in FIG. 3, the target dimension in this step exemplarily includes a music style dimension and an audio fingerprinting dimension.

It should be noted that, in some cases, the duration of the first multimedia resource (in this embodiment, the first multimedia resource is the target audio file) is too long, the server device may slice the first multimedia resource and the audio files of the clipping templates included in the template database respectively, to acquire first audio sub-files corresponding to the first multimedia resource and second audio sub-files corresponding to the audio files included in the respective clipping templates.

In this step, the server device may slice them at constant intervals, to obtain the first audio sub-file and second audio sub-file having the same audio durations. Thus, the music style identification sub-model and the audio fingerprinting identification sub-model can analyze them segment by segment expediently.

Furthermore, in practical applications, the durations of the audio files contained in the clipping templates may be different, i.e., some clipping templates contain the audio file with a longer duration, while some clipping templates contain the audio file with a shorter duration. If the audio file included in the clipping template has longer duration, the audio file may be sliced at the above constant interval. If the duration of the audio file included in the clipping template meets the above constant interval, the slicing operation no needs to be performed. Whether the slicing operation needs to be performed may be flexibly set according to practical requirements.

Hereinafter, two cases that the candidate clipping template is all of at least one clipping template or a part of at least one clipping template may be described below.

A. On the Premise that the Candidate Clipping Template is all of the at Least One Clipping Template In this case, the first audio sub-file corresponding to the first multimedia resource and the second audio sub-file corresponding to the audio file contained in the clipping template may be inputted into the music style identification sub-model and the audio fingerprinting identification sub-model respectively. As a result, the first identification result corresponding to the clipping template outputted by the music style identification sub-model and the second identification result corresponding to the clipping template outputted by the audio fingerprinting identification sub-model are acquired.

Next, the search result is acquired based on the first identification result and the second identification result corresponding to the candidate clipping template.

The music style identification sub-model and the audio fingerprinting identification sub-model may perform identification tasks in parallel, or may perform identification tasks sequentially.

B. On the Premise that the Candidate Clipping Template is a Part of the at Least One Clipping Template In this case, before step S402, the method further include: S402'. In S402', the candidate clipping template is determined based on the features of the target audio file and at least one clipping template in the target dimension.

The number of candidate clipping template may be one or more.

The "at least one clipping template" in this step may include a part of clipping template in the template database, or may include all clipping templates in the template database. When "the at least one clipping template" includes a part of clipping template in the template database, at least one clipping template may be determined according to factors such as the posting time, usage, and favorites of the clipping template; or it may be randomly determined; or it may be determined by any other means.

In the case where the priority of music style dimension is higher than that of audio fingerprinting dimension, the first audio sub-file corresponding to the first multimedia resource and the second audio sub-files corresponding to the audio files included in the clipping templates are inputted into the music style identification sub-model, to acquire the first identification results corresponding to the clipping templates in the template database.

Then, based on a preset filtering condition corresponding to the music style dimension and the first identification results corresponding to the clipping templates, a second filtering result corresponding to the music style dimension is obtained. The second filtering result corresponding to the music style dimension includes one or more clipping templates.

Subsequently, the first audio sub-file corresponding to the first multimedia resource and the second audio sub-file corresponding to the clipping template contained in the second filtering result corresponding to the music style dimension, are inputted into the audio fingerprinting identification sub-model, to acquire the second identification result corresponding to the clipping template contained in the second filtering result corresponding to the music style dimension.

In the case that the audio fingerprinting dimension is preset with a corresponding filtering condition, the first filtering result may be acquired based on the filtering condition and the second identification result corresponding to the clipping template contained in the second filter result corresponding to the music style dimension. The clipping template included in the first filtering result is the aforementioned candidate clipping template.

In the case where the priority of the audio fingerprinting dimension is higher than that of the music style dimension, the first audio sub-file corresponding to the first multimedia resource and the second audio sub-files corresponding to the audio files included in the clipping templates are inputted into the audio fingerprinting identification sub-model, to acquire the second identification results corresponding to the clipping templates in the template database.

Then, based on a preset filtering condition corresponding to the audio fingerprinting dimension and the second identification results corresponding to the clipping templates, a second filtering result corresponding to the audio fingerprinting dimension is obtained. The second filtering result corresponding to the audio fingerprinting dimension includes one or more clipping templates.

Subsequently, the first audio sub-file corresponding to the first multimedia resource and the second audio sub-file corresponding to the clipping template contained in the second filtering result corresponding to the audio fingerprinting dimension, are inputted into the music style identification sub-model, to acquire the first identification result corresponding to the clipping template contained in the second filtering result corresponding to the audio fingerprinting dimension.

In the case that the music style identification sub-model is preset with a corresponding filtering condition, the first filtering result may be acquired based on the filtering condition and the second identification result corresponding to the clipping template contained in the second filter result corresponding to the audio fingerprinting dimension. The clipping template included in the first filtering result is the aforementioned candidate clipping template.

In some cases, the filtering condition corresponding to the music style dimension or the audio fingerprinting dimension may be null.

The search result based on the first identification results and the second identification results respectively corresponding to candidate clipping templates may be acquired by: acquiring weighted calculation results corresponding to the respective candidate clipping templates, based on the first identification results and the second identification results corresponding to the respective candidate clipping templates, a weight coefficient corresponding to the music style dimension, and a weight coefficient corresponding to the audio fingerprinting dimension.

The search result is acquired based on the weighted calculation results corresponding to the respective candidate clipping template and a first preset threshold. In the case that the highest score in the weighted calculation results corresponding to the respective candidate clipping templates is greater than the first preset threshold, it is determine that a target clipping template matching the first multimedia resource is searched out from the template database, and the target clipping template is the clipping template with the highest score in the weighted calculation results. In the case that the highest score in the weighted calculation results corresponding to the candidate clipping templates is less than or equal to the first preset threshold, it is determined that no target clipping template matching the first multimedia resource is searched out from the template database.

In practical applications, the weight coefficients corresponding to the music style dimension and the audio fingerprinting dimension may be flexibly configured as required. The weight coefficient is proportional to the proportion of the dimension and the impact on the search result.

In this embodiment, the audio file specified by the user (i.e. the first multimedia resource) and the audio files contained in the clipping templates in the template database are analyzed in the music style dimension and the audio fingerprinting dimension, by using a pre-trained search model. Then, whether the clipping template is the target clipping template that the user wants to find is comprehensively evaluated based on the analysis results in two dimensions, which ensures the accuracy of the search result. In addition, the above search task is performed by using a search model, which can improve search efficiency.

In addition, if a priority order is configured for the sub-models included in the search model, the identification and filtering may be performed step-by-step, which can reduce the calculation of the search model and further improve search efficiency.

Second Case: The First Multimedia Resource is a Video File

Figure 5:
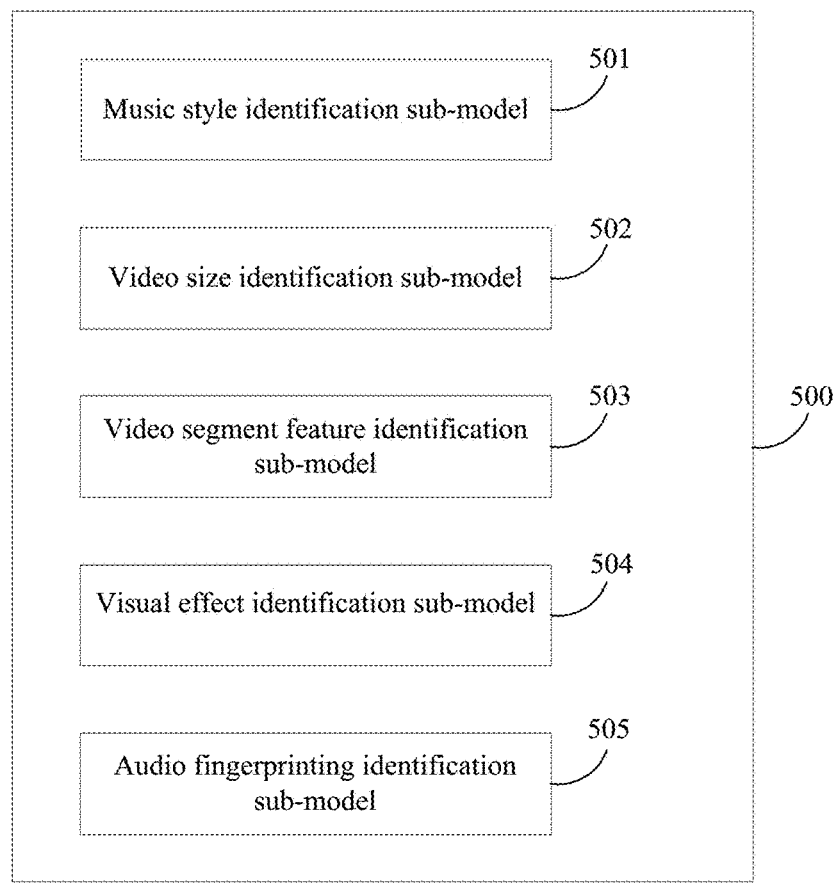
FIG. 5 is a schematic structural diagram of a search model according to another embodiment of the present disclosure.
Figure 6:
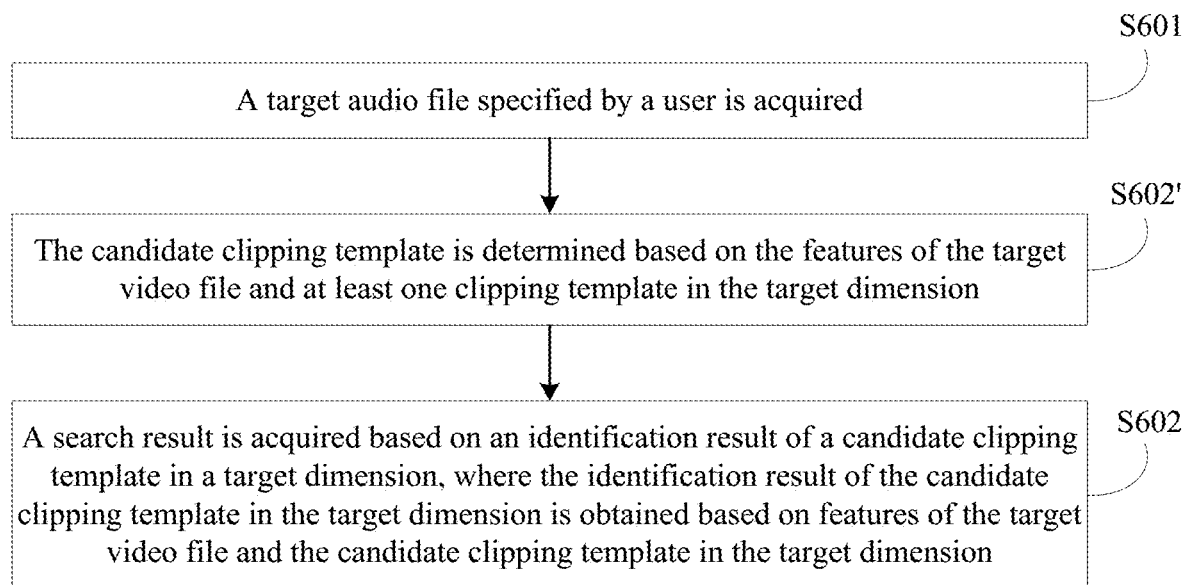
FIG. 6 is a flowchart of a method for searching for a clipping template according to another embodiment of the present disclosure.

FIG. 5 is a schematic structural diagram of a search model according to an embodiment of the present disclosure; and FIG. 6 is a flowchart of a method for searching for a clipping template according to another embodiment of the present disclosure.

Referring to FIG. 5, the search model 500 includes five sub-models, i.e., a music style identification sub-model 501, a video size identification sub-model 502, a video segment feature identification sub-model 503, a visual effect identification sub-model 504 and an audio fingerprinting identification sub-model 505.

The music style identification sub-model 501 included in the search model 500 provided in the embodiment shown in FIG. 5 is similar to the music style sub-model 301 included in the search model 300 provided in the embodiment shown in FIG. 3. The audio fingerprinting identification sub-model 505 included in the search model 500 provided in the embodiment shown in FIG. 5 is similar to the audio fingerprinting identification sub-model 302 included in the search model 300 provided in the embodiment shown FIG. 3. The details of the music style identification sub-model 501 and the audio fingerprinting identification sub-model 505 may refer to the detailed description in the embodiment shown in FIG. 3, which will not be repeated herein.

The video size identification sub-model 502 is configured to output third identification results corresponding to the respective clipping templates in the video size dimension based on a size feature of the first multimedia resource and size features of the clipping templates. The third identification result is used to indicate the similarity between the video size of the first multimedia resource and that of the clipping template.

The size feature includes the duration and/or an aspect ratio of the video frame. Specifically, the size feature of the first multimedia resource includes: the duration of the multimedia file and/or the aspect ratio of the video frame in the multimedia file. Similarly, the size feature of the clipping template includes: the duration of the clipping template and/or the aspect ratio of the video frame in the clipping template.

It should be understood that in this solution, the aspect ratio of the video frame may be obtained by dividing the length of the video frame by the width of the video frame or may be obtained by dividing the width of the video frame by the length of the video frame.

When the third identification result is represented by a video size score, the closer the video durations are, the closer the aspect ratios of the video frames are, and the higher the video size similarity is, the higher the video size score is; and the greater the difference in the video durations is, the greater the difference in the aspect ratios of the video frames is, the lower the video size similarity is, the lower the video size score is.

The video segment feature identification sub-model 503 is configured to output the fourth identification result corresponding to the clipping template in the video segment feature dimension, based on a video segment feature of the first multimedia resource and a video segment feature of the clipping template. The fourth identification result is used to indicate the similarity between the video segment of the first multimedia resource and that of the clipping template.

The video segment feature identification sub-model 503 is configured to segment the first multimedia resource based on a transition moment of the first multimedia resource, to obtain multiple first video sub-segments corresponding to the first multimedia resource; segment the respective clipping templates based on transition moments of the respective clipping templates, to obtain multiple second video sub-segments corresponding to the respective clipping templates. Next, the video segment feature identification sub-model 503 is configured to obtain a fourth identification result corresponding to each video template file according to the sequence of the first video sub-segments, the sequence of the second video sub-segments based on the features such as the duration and transition mode of the video sub-segments.

The fourth identification result is represented by a video segment feature score. In the case that the transition modes of the video frames are the same, the closer the durations of the video sub-segments are, the higher the similarity of the video segment is, the higher the video segment feature score is. In the case that the transition modes of the video frames are different, the greater the difference in the durations of video sub-segments is, the lower the similarity of the video segment, the lower the video segment feature score is.

The visual effect identification sub-model 504 is configured to output a fifth identification result corresponding to the clipping template in the visual effect dimension, based on the visual effect of the first multimedia resource and the visual effect of the clipping template. The fifth identification result is used to indicate the similarity between the visual effect of the first multimedia resource and that of the clipping template.

The visual effect identification sub-model 504 specifically identifies one or more of a sticker material style, a sticker material size, a text material style, a text material size, a filter effect and the like used by each of the first multimedia resource and the clipping template, to obtain the fifth identification result in the visual effect dimension.

On the basis of the search model 500 as shown in FIG. 5, in combination with FIG. 6, a method for searching for a clipping template according to the embodiment includes as follows.

In S601, the server device acquires a target video file.

It should be understood that, in this embodiment, the above target video file is the first multimedia resource. The specific implementation of acquiring the target video file by the server device may refer to the description in the embodiment shown in FIG. 2, which will not be repeated here.

In S602, a search result is acquired based on an identification result of a candidate clipping template in a target dimension, where the identification result of the candidate clipping template in the target dimension is obtained based on features of the target video file and the candidate clipping template in the target dimension.

As shown in the search model shown in FIG. 5, the target dimension in the embodiment includes: a music style dimension, an audio fingerprinting dimension, a video size dimension, a video segment feature dimension and a visual effect dimension.

It should be noted that, in some cases, the duration of the first multimedia resource is too long, the first multimedia resource and clipping templates may be sliced. In the case that the duration of the first multimedia resource is too long, the server device may sliced the first multimedia resource and the audio files of the clipping templates included in the template database respectively to acquire first audio sub-files corresponding to the first multimedia resource and second audio sub-files corresponding to the audio files included in the respective clipping templates.

The implementation of slicing processing may refer to the detailed description in the embodiment shown in FIG. 4.

A. On the Premise that the Candidate Clipping Template is all of the at Least One Clipping Template In this case, the first multimedia resource and the at least one clipping template may be inputted into the five sub-models included in the search model 500 respectively, and the first identification results to fifth identification results corresponding to the clipping templates may be acquired from the five sub-models respectively.

Next, the search result is acquired based on the first identification results to fifth identification results corresponding to the respective candidate clipping templates.

B. On the Premise that the Candidate Clipping Template is a Part of the at Least One Clipping Template In this case, before step S602, the method further include: S602'. In S602', the candidate clipping template is determined based on the features of the target video file and at least one clipping template in the target dimension.

The number of candidate clipping template may be one or more.

The "at least one clipping template" in this step may include a part of clipping template in the template database, or may include all clipping templates in the template database. When "at least one clipping template" includes a part of clipping templates in the template database, at least one clipping template may be determined according to factors such as the posting time, usage, and favorites of the clipping templates; or it may be randomly determined; or determined by any other means.

In an optional implementation, S602' may include the steps as follows.

In step a, the current dimension is determined based on a priority order of the above five sub-models.

Specifically, the priority order of the five sub-models in the search model 500 is the priority order of respective dimensions in the corresponding target dimensions. The current dimension is determined based on the priority order of the five sub-models in the search model 500 from high to low.

In step b, a first identification result for each clipping template in the first filtering result in the current dimension is acquired, based on a feature of the first multimedia resource in the current dimension and a feature of a first filtering result in the current dimension.

In this step, the first filtering result is a filtering result corresponding to a previous dimension.

In step c, a second filtering result corresponding to the current dimension is acquired, based on the first identification results and a filtering condition corresponding to the current dimension, where the second filtering result includes one or more clipping templates, and an initial state of the first filtering result includes the at least one clipping template.

In step d, the second filtering result is determined as the first filtering result.

Step a is returned to and performed, until the second filtering result corresponding to the last current dimension is acquired, and the clipping template included in the second filtering result corresponding to the last current dimension is determined as the candidate clipping template.

It should be noted that in the above process, the filtering conditions corresponding to some dimensions may be configured as null.

For example, it is assumed that the priority order of the five sub-models in the search model is: the music style identification sub-model>the video size identification sub-model>the video segment feature identification sub-model>the audio fingerprinting identification sub-model>the visual effect identification sub-model. For example, if the filtering condition corresponding to the audio fingerprinting dimension is null, the audio file contained in the first multimedia resource and the audio file of the clipping template included in the second filter result corresponding to the video segment feature dimension are directly inputted into the audio fingerprinting identification sub-model. In other words, the clipping template included in the second filtering result corresponding to the video segment feature dimension is the same as the clipping template included in the second filtering result corresponding to the audio fingerprinting dimension.

It should be noted that the priority order of the sub-models in the search model may be flexibly configured, which will not be limited to the above examples. For example, the priority order of the sub-models in the search model may be: the music style identification sub-model>the video size identification sub-model>the audio fingerprinting identification sub-model>the video segment feature identification sub-model>the visual effect identification sub-model. Alternatively, the priority order of may also be: the music style identification sub-model>the video size identification sub-model>the audio fingerprinting identification sub-model=the video segment feature identification sub-model>the visual effect identification sub-model, etc.

In this embodiment, the music style identification sub-model and the audio fingerprinting identification sub-model in the search model analyze the audio file in the multimedia file and the audio files in the clipping templates. In the case that the durations of the audio file in the multimedia file and the audio files in the clipping templates are both too long, the audio files with the too long duration may be sliced by the method in the embodiment shown in FIG. 4. More details may refer to the description in the embodiment shown in FIG. 4, which will not be repeated here.

The search result may be acquired based on the first identification results to the fifth identification results corresponding to the respective clipping templates, by: acquiring weighted calculation results corresponding to the respective candidate clipping templates, based on the first identification results to the fifth identification results corresponding to the candidate clipping templates, and the weight coefficients corresponding to the music style dimension, the video size dimension, the video segment feature dimension, the audio fingerprinting dimension and the visual effect dimension respectively.

The search result is acquired, based on weighted calculation results corresponding to the respective candidate clipping templates and a second preset threshold. In the case that the highest score in the weighted calculation results corresponding to the candidate clipping templates is greater than a second preset threshold, it is determine that a target clipping template matching the target multimedia resource is searched out from the template database, and the target clipping template is the clipping template corresponding to the highest score in the weighted calculation results. In the case that the highest score in the weighted calculation results corresponding to the candidate clipping templates is less than or equal to the second preset threshold, it is determined that no target clipping template matching the first multimedia resource is searched out from the template database.

Optionally, values of the first preset threshold and the second preset threshold may be the same or different.

In this embodiment, the target video file specified by the user (i.e. the first multimedia resource) and the candidate clipping templates are analyzed in the music style dimension, the audio fingerprinting dimension, the video size dimension, the video segment feature dimension and the visual effect dimension, by using a pre-trained search model. Then, whether the candidate clipping template is the target clipping template that the user wants to find is comprehensively evaluated based on the analysis results in five dimensions, which ensures the accuracy of the search result.

In addition, if a priority order is configured for the sub-models included in the search model, the identification and filtering may be performed step-by-step, which can reduce the calculation of the search model and further improve search efficiency.

In practical applications, the search model may be adjusted based on different scenarios and purposes. For example, in some cases, the search model may only include a music style identification sub-model. The embodiments shown in FIG. 3 and FIG. 5 do not limit the specific implementation of the search model.

Figure 7:
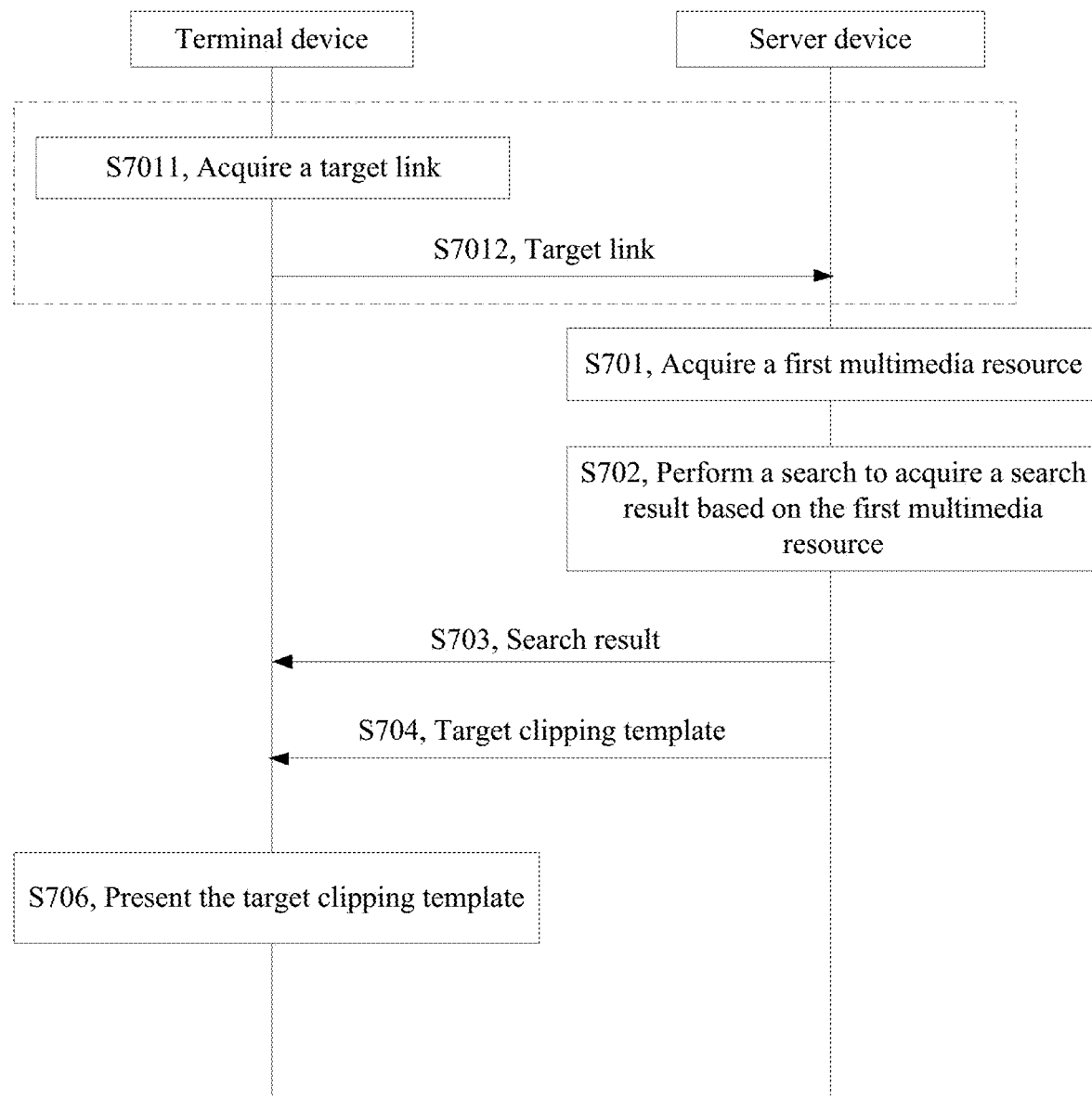
FIG. 7 is a flowchart of a method for searching for a clipping template according to another embodiment of the present disclosure.

FIG. 7 is a flowchart of a method for searching for a clipping template according to another embodiment of the present disclosure. Referring to FIG. 7, in this embodiment, the method includes steps S701 to S706 as follows.

In S701, the server device acquires a first multimedia resource.

In S702, the server device performs a search based on the first multimedia resource, to acquire a search result.

In S703, the server device returns the search result to the terminal device. Correspondingly, the terminal device receives the search result returned by the server device.

In S704, the server device acquires a target clipping template from the template database based on the search result.

In S705, the server device sends the target clipping template to the terminal device.

Specifically, when the search result indicates that a target clipping template matching the first multimedia resource is searched out, the server device may extract all data corresponding to the target clipping template from the template database based on the identifier of the target clipping template, package the extracted data, and send the data to the terminal device.

In S706, the terminal device displays the target clipping template.

After receiving the data of the target clipping template, the terminal device decodes and displays the target clipping template, so that the user holding the terminal device can check detailed information of the target clipping template.

In this embodiment, the target clipping template matched based on the first multimedia resource specified by the user is presented to the user. Thus, the target clipping template is more in line with the requirements of the user for video creation, which can improve the utilization rate of the target clipping template and enthusiasm of the user for video creation.

In some other cases, in the case that the search result indicates that no target clipping template matching the first multimedia resource is searched out, the terminal device may display to the user a prompt message that no target clipping template is searched out, based on the search result.

Based on the foregoing description, combining with the drawings and application scenarios, the method for searching for a clipping template according to the embodiments of the present disclosure is provided in detail. For the convenience of illustration, the following takes the terminal device as a mobile phone as an example. A video editing APP (abbreviated as an application 1) and a video type APP (abbreviated as an application 2) are installed in the mobile phone.

Currently, mobile phones and other terminal devices provide a smart clipboard reading function, by which copied content can be automatically filled. A method for searching for a clipping template is provided according to the present disclosure, in the two scenarios that the smart clipboard reading function is enabled and the smart clipboard reading function is disabled in the mobile phone.

First Scenario:

The user may copy the target link through other video type applications or music type applications. In the case that the smart clipboard reading function of the mobile phone is enabled and the user opens the application 1, the application 1 may acquire the target link from the clipboard.

Figure 8A:
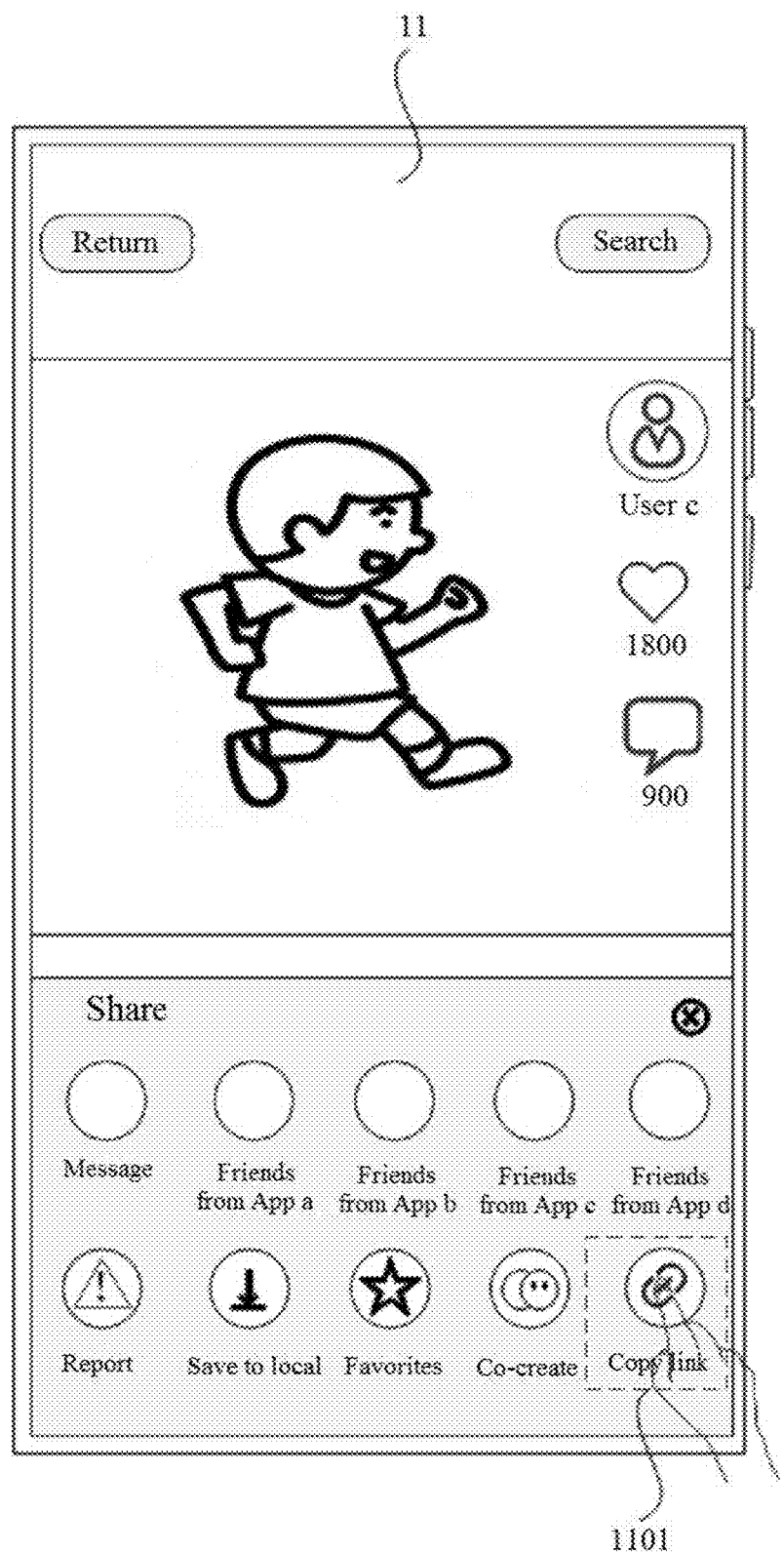
FIG. 8A to 8K are schematic diagrams of human-computer interaction interfaces according to the present disclosure.

Exemplarily, the application 2 may display the user interface 11 on the mobile phone as shown in FIG. 8A. The user interface 11 is used to display a video playback page of the application 2. The application 2 may perform some function sets in the video playback page, such as playing multimedia files (such as short videos) and sharing multimedia files. The user interface 11 includes: a control 1101 configured to copy a link of a multimedia file which is being played.

It should be understood that the link of the multimedia file that is being played is the target link described above.

After the user exits the application 2 and opens the application 1 within a preset time period, the application 1 sends the target link to the server by the background. The preset duration may be, for example, 5 seconds, 10 seconds and the like. While waiting for the search result returned from the server, the application 1 may display the user interface 12 exemplarily shown in FIG. 8B on the mobile phone. The user interface 12 is used to display a waiting page of the application 1.

The current searching progress is displayed on the user interface 12. For example, the "Recognition progress 75%" is displayed on the waiting page displayed on the user interface 12 exemplarily. The user interface 12 may further include a control 1201 configured to give up the current search task.

Figure 8B:
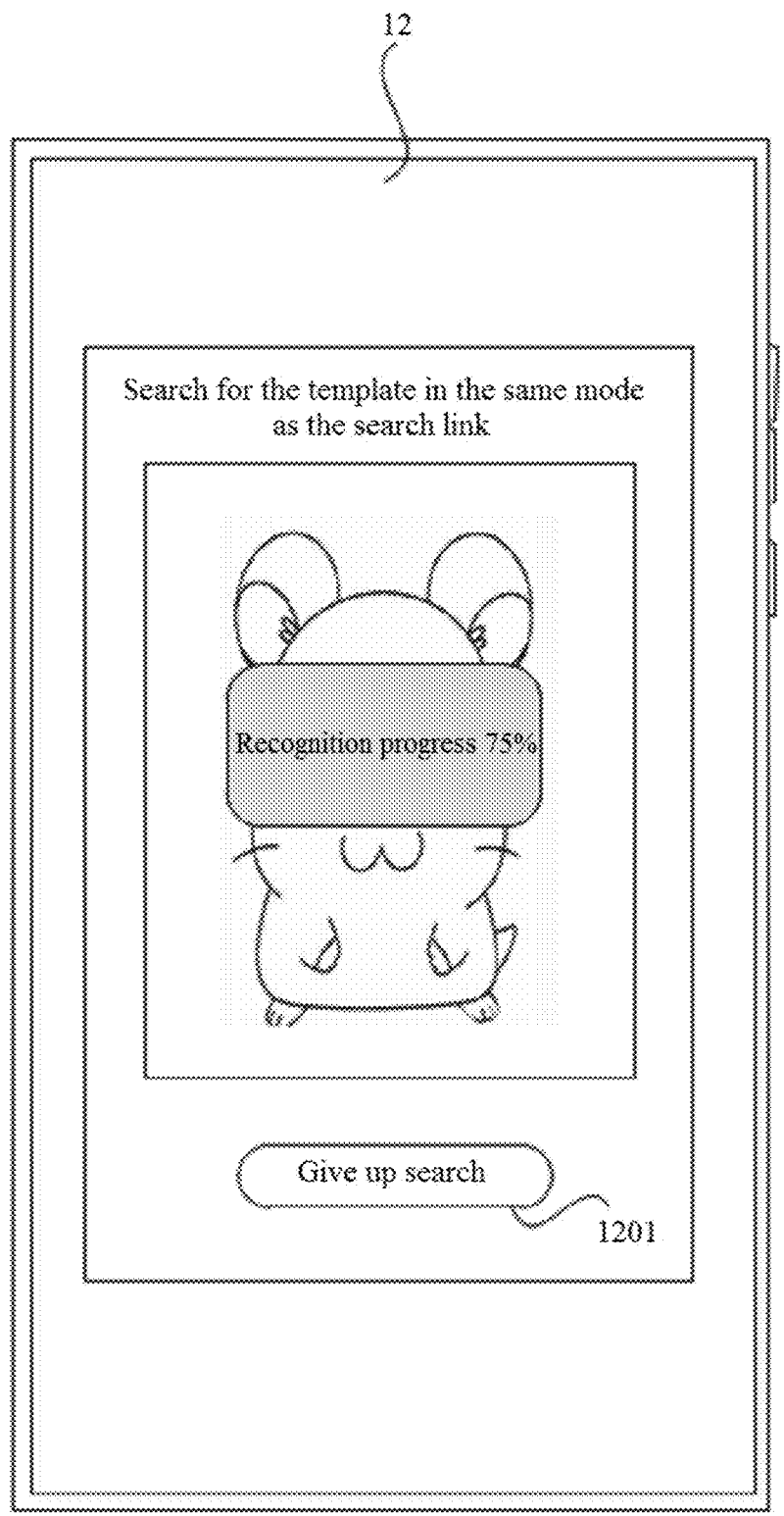

After receiving an operation of the user on the user interface 12 shown in FIG. 8B, such as clicking the control 1201, the application 1 may display a default home page of the application 1 on the mobile phone.

Figure 8C:
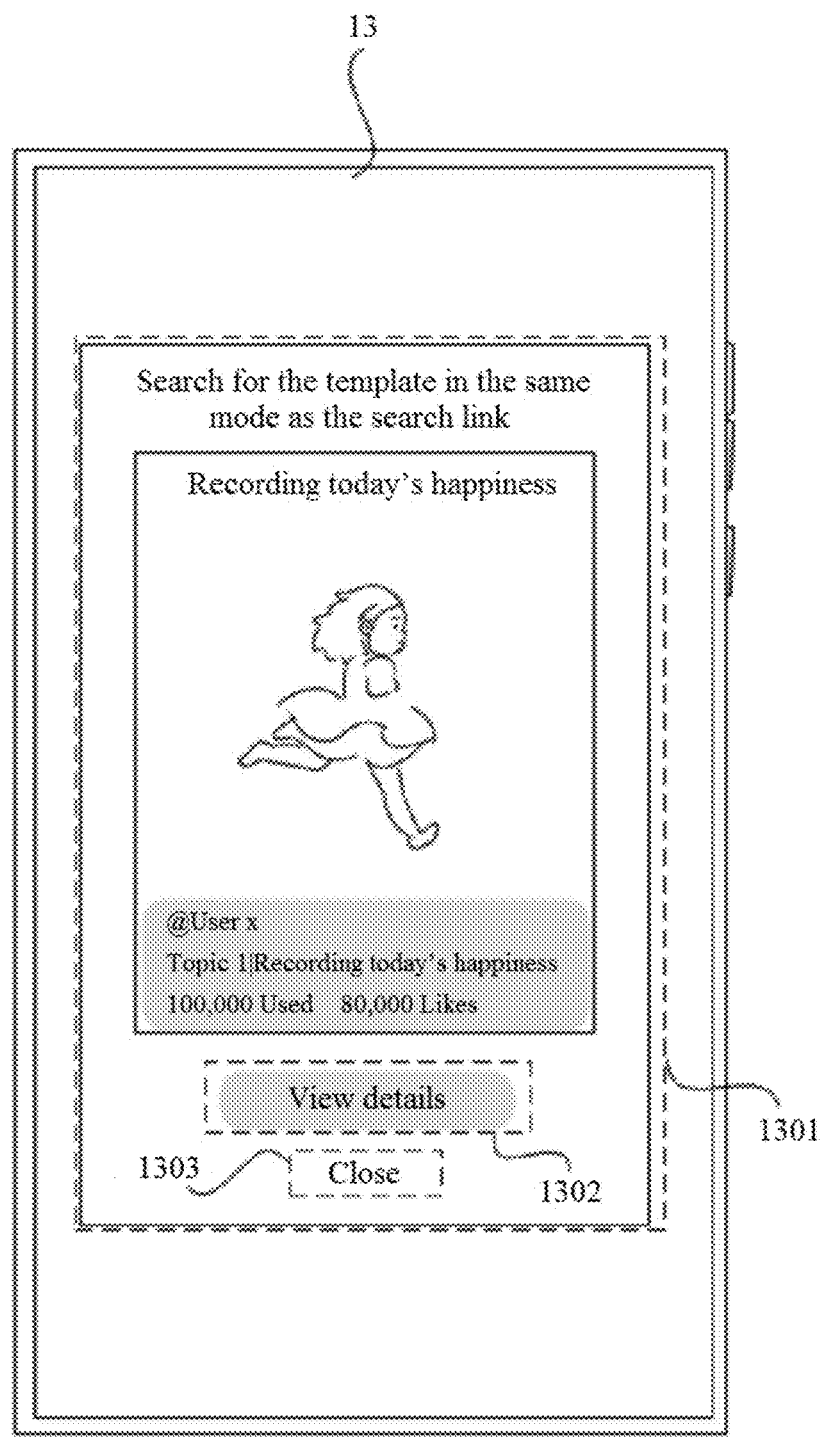

When receiving the search result returned by the server and the data of the matched target clipping template, the application 1 may display the user interface 13 exemplarily shown in FIG. 8C on the mobile phone. The user interface 13 includes: a presenting window 1301 configured to present a cover of the target clipping template. The cover may be any video frame or a specific video frame of the video in the target clipping template.

The user interface 13 further includes: a control 1302 configured to enter a details page of the target clipping template. Once receiving an operation performed by the user on the user interface 13 shown in FIG. 8C, such as clicking the control 1302, the application 1 displays the user interface 14 shown in FIG. 8D on the mobile phone. The user interface 14 is used to display the video playback page of the application 1. The application 1 may perform some function sets on the video playback page, such as playing multimedia files, providing a visualized entrance to the video creation page, etc.

The user interface 13 further includes: a control 1303 configured to close the presenting window 1301.

After receiving a click operation performed by the user on the control 1302 on the user interface 13 shown in FIG. 8C, the application 1 may send a request for acquiring a clipping template to the server through the mobile phone. The request for acquiring the clipping template is used to request to acquire all data of the target clipping template.

The user interface 14 includes: a control 1401 configured to enter a video creation page in which the target clipping template is used as a creating template.

In addition, after receiving a sliding operation performed by the user on the user interface 13 shown FIG. 8C, the application 1 may send a request for acquiring a candidate clipping template to the server through the mobile phone. The request for acquiring the candidate clipping template is used to request all data of a candidate clipping template that ranks second to the target clipping template in weighted scores.

After receiving the request for acquiring the candidate clipping template, the server may send all data of the candidate clipping template that ranks second to the target clipping template in weighted scores to the mobile phone based on the search result.

Figure 8D:
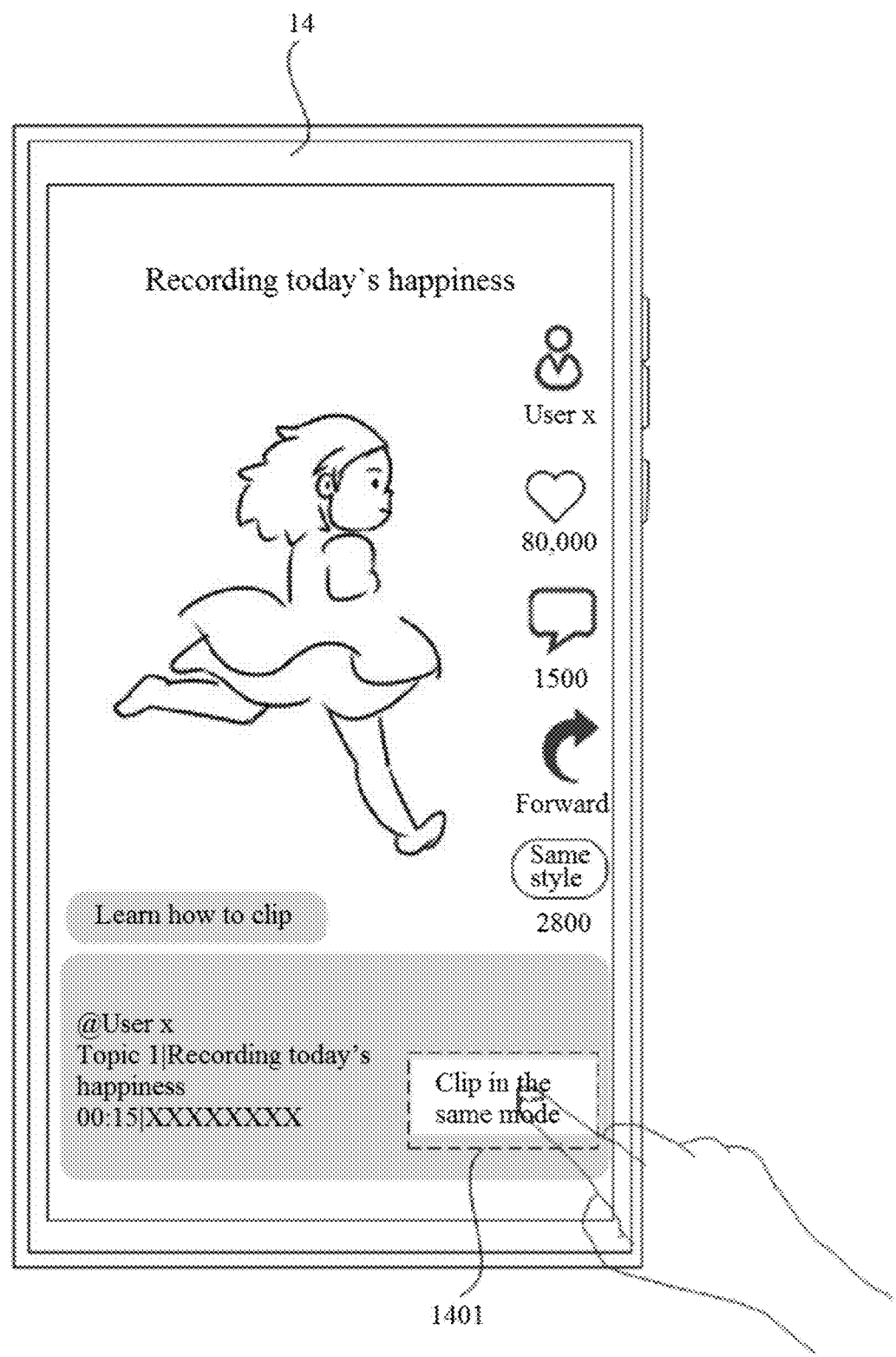
Figure 8E:
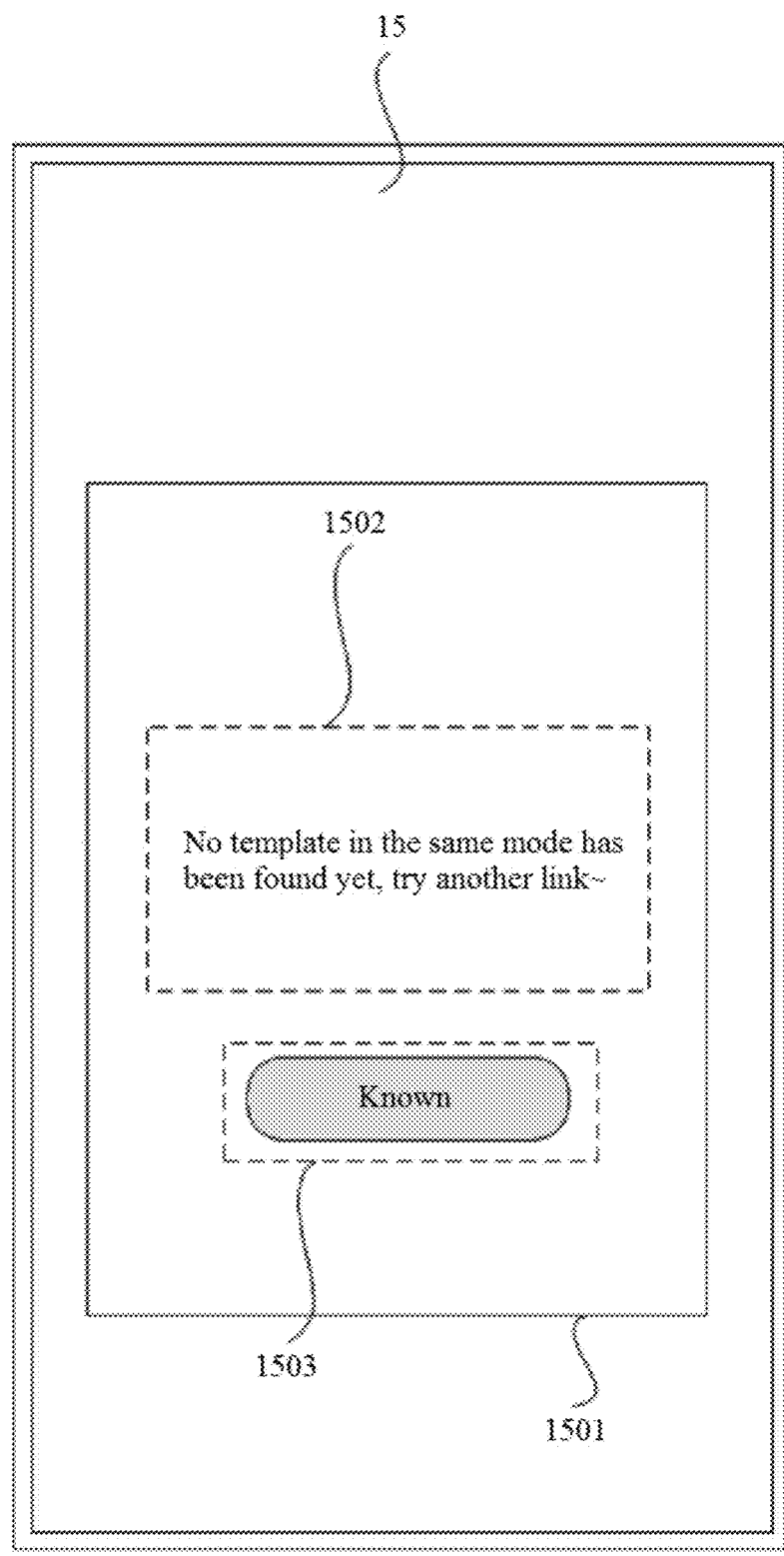

In the case that the search result returned by the server indicates that no target clipping template matching the target link is included in the template database, after application 1 displays the waiting page shown in FIG. 8B on the mobile phone, the user interface 15 shown in FIG. 8E may be displayed on the mobile phone. The user interface 15 includes a window 1501. The window 1501 includes a text information display area 1502 and a control 1503.

The text information display area 1502 may display relevant content of the search result. For example, the text information display area 1502 displays a text "No template in the same mode has been found yet, try another link~".

The control 1503 is used to close the window 1501.

Exemplarily, after receiving an operation performed by the user on the user interface 15 shown in FIG. 8E, such as clicking the control 1503, the application 1 may display the default home page of the application 1 on the mobile phone.
Second Scenario:

In the case that the smart clipboard reading function of the mobile phone is disabled, the application 1 may obtain the target link through manual input by the user.

Figure 8F:
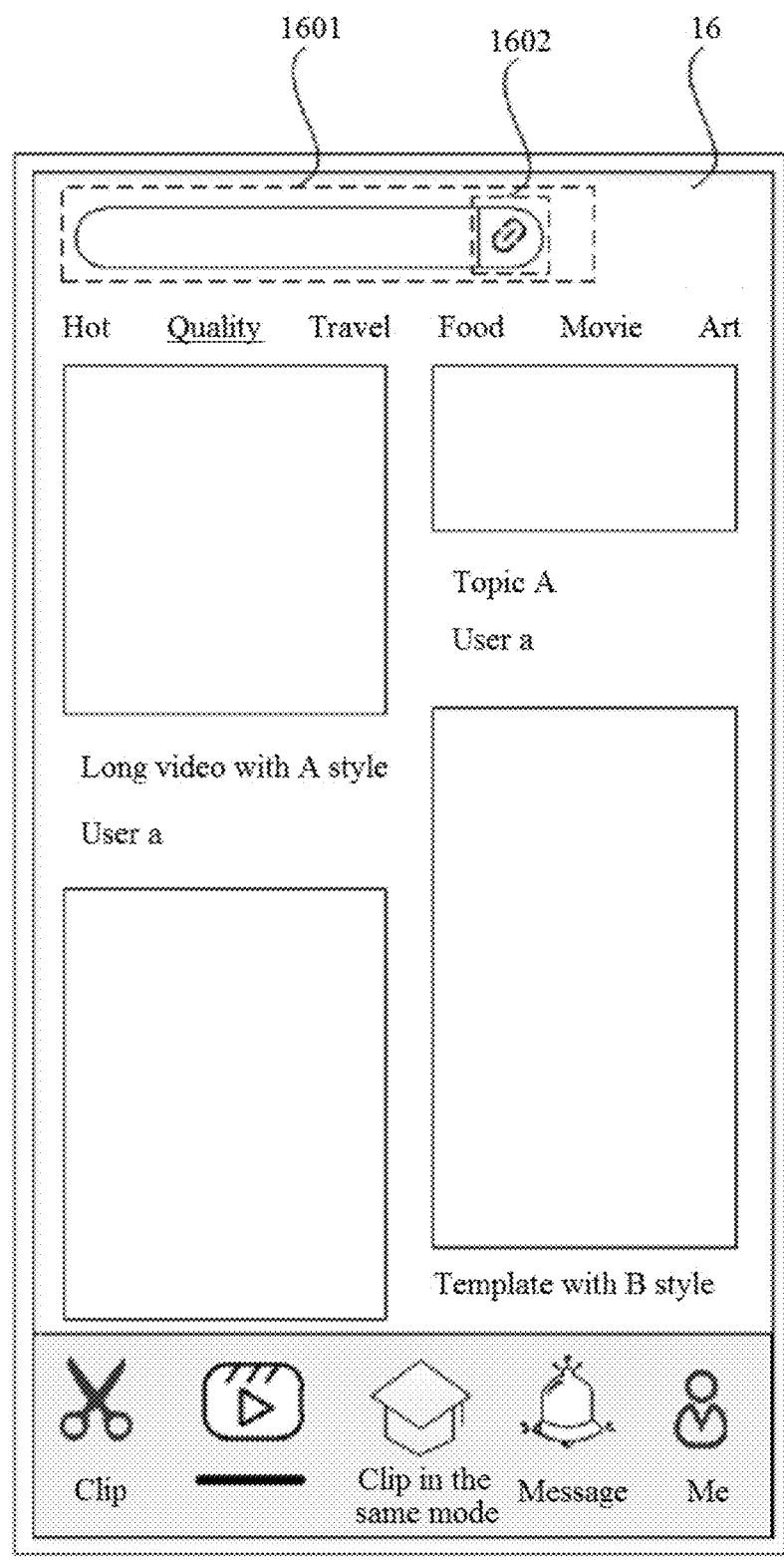

The application 1 displays a user interface 16 on the mobile phone as exemplarily shown in FIG. 8F. The user interface 16 includes: an input window 1601. The input window 1601 includes a control 1602 for entering a link search page.

Figure 8G:
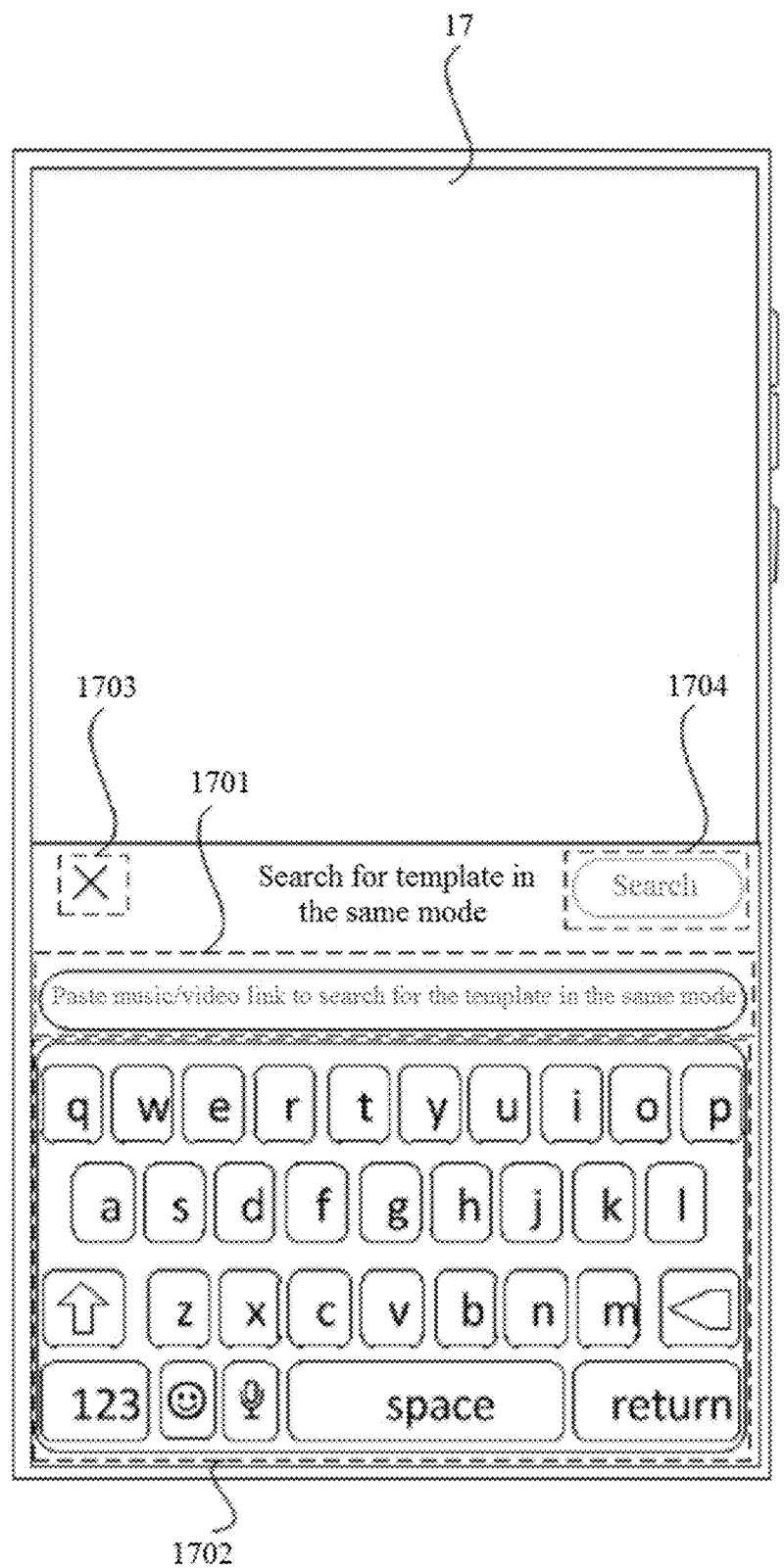

After receiving an operation performed by the user on the user interface 16 shown in FIG. 8F, such as clicking the control 1602, the application 1 displays the user interface 17 exemplarily shown in FIG. 8G on the mobile phone. The link search page displayed on the user interface 17 includes an input window 1701. Prompt information is displayed in the input window 1701 to prompt the user to paste video links or music links from other applications to find a template in the same mode.

Figure 8H:
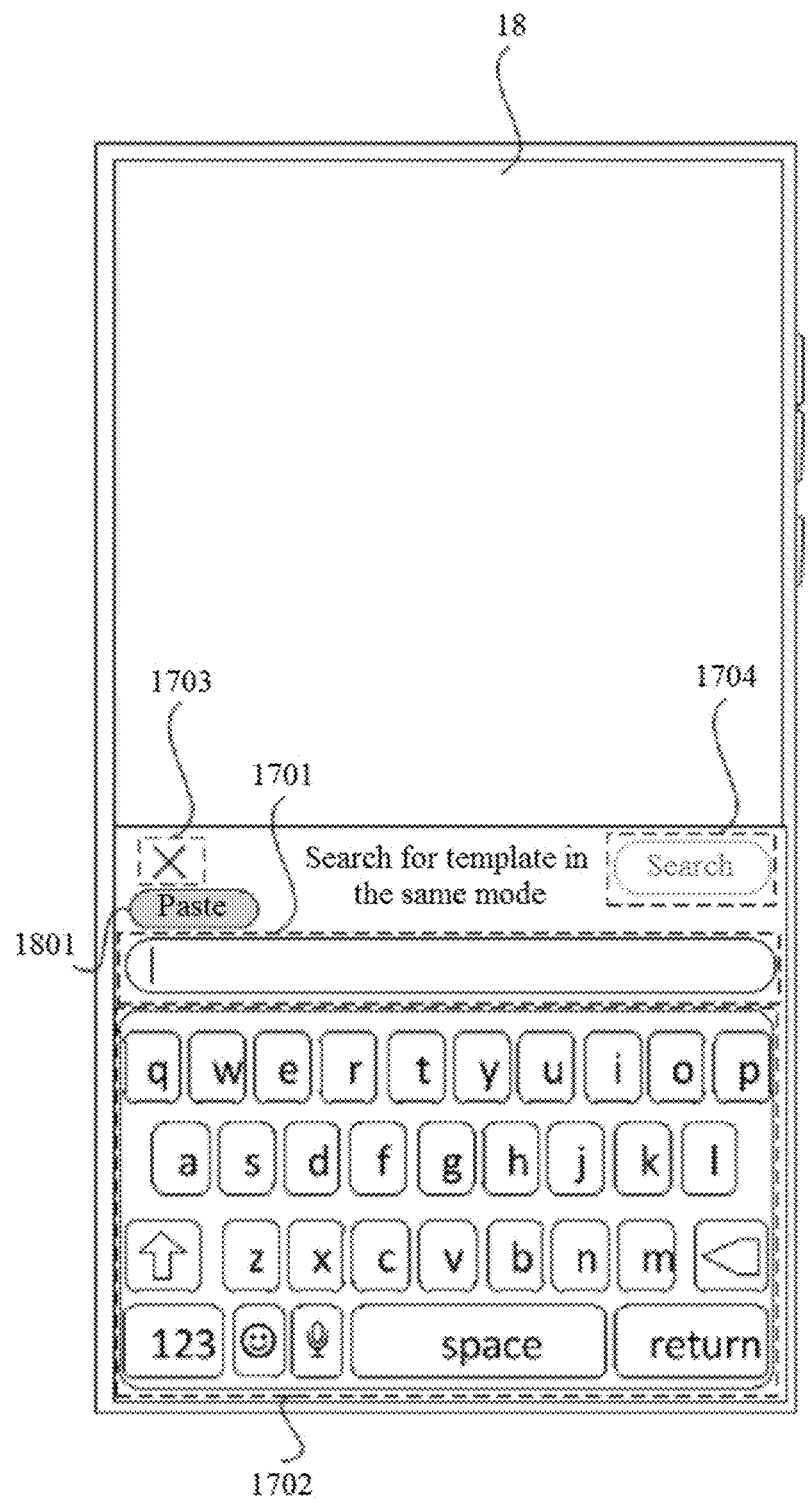

If the user has copied the target link from other video type applications or music type applications, the application 1 may display the user interface 18 as shown in FIG. 8H after receiving an operation performed by the user on the user interface 17 shown in FIG. 8G, such as long-pressing the input window 1701. The user interface 18 includes a control 1801 configured to paste content of the clipboard into the input window 1701.

After receiving an operation performed by the user on the user interface 18 shown in FIG. 8H, such as clicking on the control 1801, the application 1 displays the target link in the input window 1701. Correspondingly, the application 1 displays the user interface 19 shown in FIG. 8I on the mobile phone.

In other cases, the user interface 17 may further include: an input method soft keyboard area 1702. The user may manually input the target link into the input window 1701 by operating the input method soft keyboard area 1702.

The user interface 17 may further include a control 1703 configured to close the link search page.

The user interface 17 may further include a control 1704 for generating a search task according to the target link. The mobile phone sends the target link to the server according to the search task.

In an embodiment, the user interface 19 may further include: a control 1705 configured to delete all content in the input window 1701. For example, after receiving an operation performed by the user on the user interface 19 shown in FIG. 8I, such as clicking the control 1705, the application 1 displays the user interface 17 shown in FIG. 8G on the mobile phone. As another example, when the user manually operates the input method soft keyboard area 1702 included in the user interface 17 to input part or all of the content of the target link into the input window 1701, the user may delete all content in the input window 1701 by operating the control 1705.

When the application 1 detects that an incorrect target link in the input window 1701 shown in the user interface 17 and the user interface 18 is inputted, the control 1704 is in a first state. When the application 1 detects that a correct target link in the input window 1701 is inputted, the control 1704 is in a second state.

The first state is an inactive state, and the second state is an activated state. In the inactive state, the operation control 1704 cannot generate a search task; and in the activated state, the operation control 1704 can generate a search task based on the target link inputted in the input window 1701.

For example, the user interface 18 and the user interface 19 may include the control 1704. The control 1704 in the user interface 18 is in the first state, and the control 1704 in the user interface 19 is in the second state.

Figure 8I:
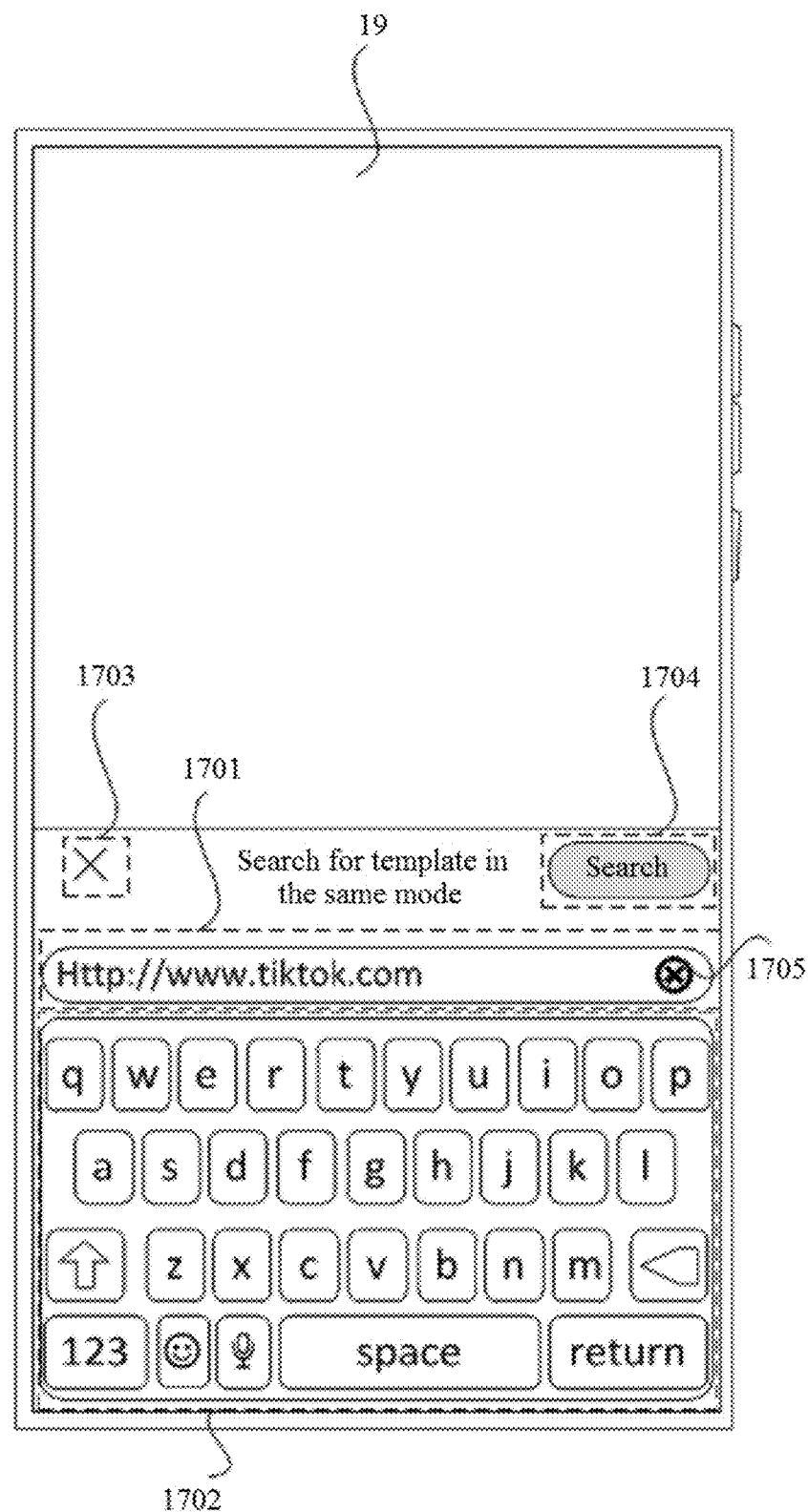

After receiving an operation performed by the user on the user interface 19 shown in FIG. 8I, such as clicking control 1704, the application 1 generates a search task and sends the target link to the server through the mobile phone, so that the server performs a search based on the target link. In addition, after receiving an operation performed by the user on the user interface 19, such as clicking the control 1704, the application 1 may display the user interface 12 shown in FIG. 8B on the mobile phone.

In Scenario 2, if the server returns the search result, the application 1 may display the user interfaces 13 to 15 shown in FIG. 8C to FIG. 8E on the mobile phone based on the search result.

Figure 8J:
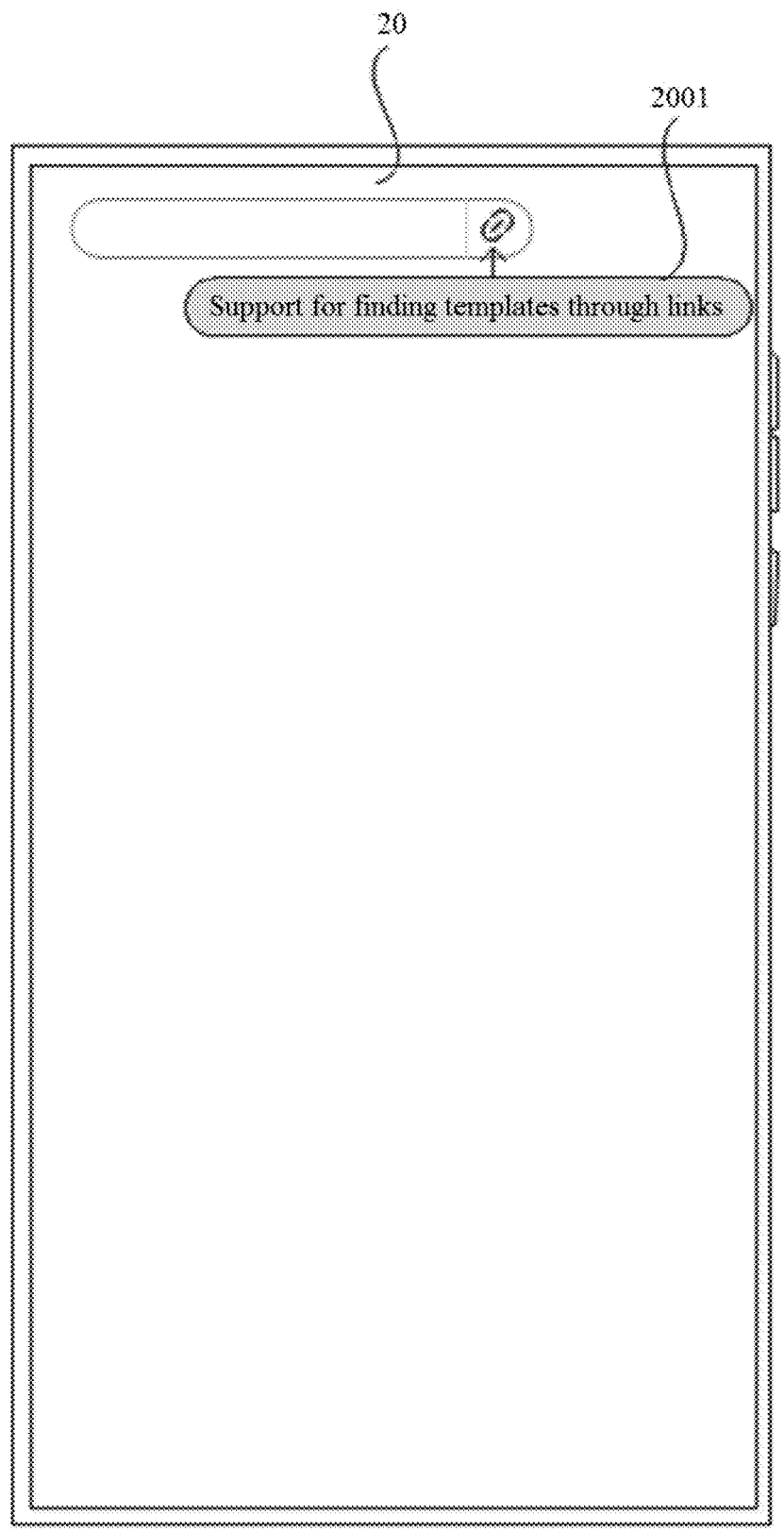

In some cases, the user may not be aware that the application 1 supports the function of searching for the template in the same mode through a link. Therefore, for users who have not used the link to search for target clipping template before, when the user opens the application 1, the application 1 may display the user interface 20 exemplarily shown in FIG. 8J on the mobile phone. The user interface 20 includes: a window 2001 configured to display guide information. For example, the guide information is "Support for finding templates through links".

Figure 8K:
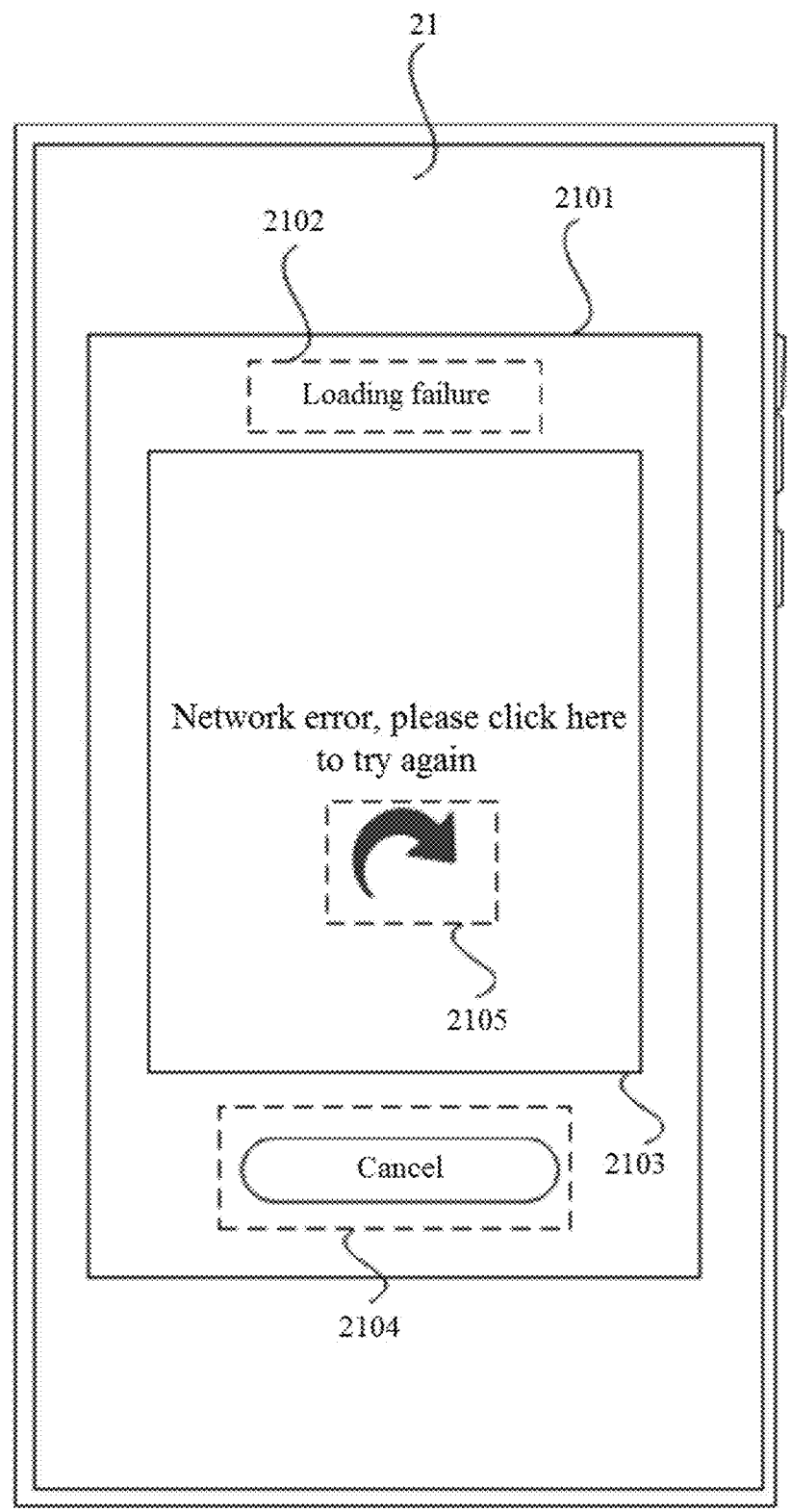

In some cases, for example, the communication quality between the mobile phone and the server is poor. Although the server can match the target clipping template based on the target link, the mobile phone cannot obtain the data of the target clipping template from the server due to the poor communication quality between the mobile phone and the server. The application 1 may display a user interface 21 as shown in FIG. 8K on the mobile phone. The user interface 21 includes a window 2101 configured to display a loading failure page. The loading failure page may include an area 2102, a window 2103, and a control 2104. The area 2102 is used to display prompt information of loading failure. The window 2103 contains a control 2105 configured to generate a new data loading task. The control 2104 is used to cancel the data loading task.

From the schematic diagrams of the human-computer interaction interfaces shown in FIG. 8A to FIG. 8K above and practical application scenarios, the method for searching for a clipping template according to the embodiments of the present disclosure is convenient for the user to operate the controls on the user interface displayed on the terminal device to quickly obtain the desired target clipping template, which can better meet the requirements of users for video creation.

Figure 9:
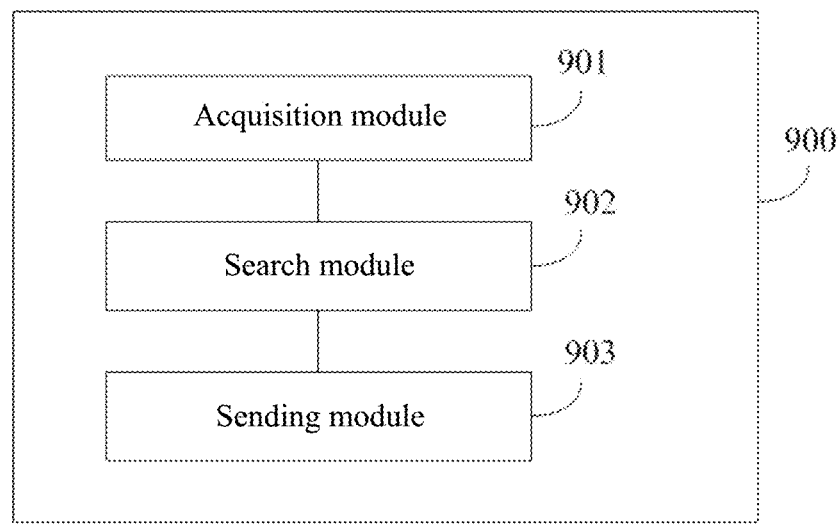
FIG. 9 is a schematic structural diagram of an apparatus for searching for a clipping template according to an embodiment of the present disclosure.

FIG. 9 is a schematic structural diagram of an apparatus for searching for a clipping template according to an embodiment of the present disclosure. Referring to FIG. 9, an apparatus 900 for searching for a clipping template searching according to this embodiment includes: an acquisition module 901 and a search module 902.

The acquisition module 901 is configured to acquire a first multimedia resource determined by a user.

The search module 902 is configured to perform a search to acquire a search result, based on the first multimedia resource.

The search result is configured to indicate whether a target clipping template matching the first multimedia resource is searched out, and the target clipping template is configured to indicate to clip a to-be-clipped multimedia material into a second multimedia resource based on a target clipping mode, and the target clipping mode is a clipping mode used in the first multimedia resource.

In some optional implementation, the search module 902 is specifically configured to acquire the search result, based on an identification result of a candidate clipping template in a target dimension, where the identification result of the candidate clipping template in the target dimension is obtained based on features of the first multimedia resource and the candidate clipping template in the target dimension.

In some optional implementation, the search module 902 is further configured to determine the candidate clipping template based on a feature of the first multimedia resource in the target dimension and a feature of at least one clipping template in the target dimension, where the at least one clipping template includes the candidate clipping template.

In some optional implementations, the target dimension includes: one or more of a music style dimension, an audio fingerprinting dimension, a video size dimension, a video segment feature dimension and a visual effect dimension.

In some optional implementations, the target dimension includes: at least two of the music style dimension, the audio fingerprinting dimension, the video size dimension, the video segment feature dimension and the visual effect dimension.

The search module 902 is specifically configured to acquire a weighted calculation result for the candidate clipping template, based on identification results of the candidate clipping template in respective target dimensions and weight coefficients corresponding to the respective target dimensions; and acquire the search result based on the weighted calculation result for the candidate clipping template.

The search module 902 is specifically configured to determine a current dimension, based on a priority order of the respective target dimensions; acquire a first identification result for each clipping template in the first filtering result in the current dimension based on a feature of the first multimedia resource in the current dimension and a feature of the first filtering result in the current dimension; acquire a second filtering result corresponding to the current dimension based on the first identification results and a filtering condition corresponding to the current dimension; where the second filtering result includes: one or more clipping templates, and an initial state of the first filtering result includes: the at least one clipping template; determine the second filtering result as the first filtering result; and return to a process of determining a current dimension based on the priority order of the respective target dimensions, until a second filtering result corresponding to a last current dimension is acquired; and determine a clipping template included in the second filtering result corresponding to the last current dimension as the candidate clipping template.

In some optional implementations, the acquisition module 901 is specifically configured to acquire a target link inputted by the user, and parse the target link to acquire the first multimedia resource.

In some optional implementations, the apparatus 900 for searching for the clipping template further includes: a sending module 903 configured to send the search result to the user.

In some optional implementations, the sending module 903 is further configured to send the target clipping template to the user based on the search result.

The apparatus for searching for the clipping template provided in this embodiment may be used to implement the technical solutions performed by the server device in any of the foregoing embodiments. Since its implementation principle and technical effect are similar, reference may be made to the detailed description above, which will not be repeated here.

Figure 10:
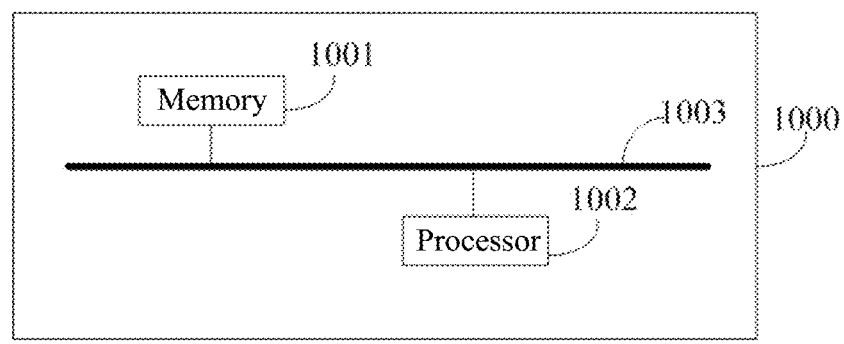
FIG. 10 is a schematic structural diagram of an electronic device according to an embodiment of the present disclosure.

FIG. 10 is a schematic structural diagram of an electronic device according to an embodiment of the present disclosure. Referring to FIG. 10, an electronic device 1000 provided in this embodiment includes: a memory 1001 and a processor 1002.

The memory 1001 may be an independent physical unit, and may be connected to the processor 1002 through a bus 1003. The memory 1001 and the processor 1002 may also be integrated as a whole by hardware and the like.

The memory 1001 is configured to store program instructions, and the processor 1002 invokes the program instructions to execute operations performed by the server device or the terminal device in any of the above method embodiments.

Optionally, when part or all of the methods in the foregoing embodiments are implemented by software, the above electronic device 1000 may also only include the processor 1002. The memory 1001 for storing programs is located outside the electronic device 1000, and the processor 1002 is connected to the memory through circuits/wires for reading and executing the programs stored in the memory.

The processor 1002 may be a central processing unit (CPU), a network processor (NP) or a combination of CPU and NP.

The processor 1002 may further include a hardware chip. The above hardware chip may be an application-specific integrated circuit (ASIC), a programmable logic device (PLD) or a combination thereof. The PLD may be a complex programmable logic device (CPLD), a field-programmable gate array (FPGA), a general array logic (GAL) or any combination thereof.

The memory 1001 may include a volatile memory, such as a random-access memory (RAM); the memory may also include a non-volatile memory, such as a flash memory, a hard disk drive (HDD) or a solid-state drive (SSD); the storage may also include a combination of the above types of storage.

A computer readable storage medium is further provided according to the present disclosure. The computer readable storage medium includes computer program instructions. When the computer program instructions are executed by at least one processor of the electronic device, the technical solutions performed by the service device or the terminal device in any one of the above method embodiments are implemented.

A program product is further provided according to the present disclosure. The program product includes a computer program, and the computer program is stored in a readable storage medium. At least one processor of the electronic device may read the computer program from the readable storage medium. The computer program, when executed by the at least one processor, cause the electronic device to implement the technical solutions performed by the service device or the terminal device in any one of the above method embodiments.

It should be noted that the relationship terms "first", "second" and the like herein are used for distinguishing an entity or operation from another entity or operation, but not intended to necessitate or imply an actual relationship or order between these entities or operations. Further, the terms "include", "comprise" or any variant thereof are intended to encompass nonexclusive inclusion such that a process, method, article or device including a series of elements includes not only those elements but also other elements which have not been listed definitely or an element(s) inherent to the process, method, article or device. Unless expressively limited otherwise, a process, method, article or device limited by "comprising/including a(n) . . . " does not exclude existence of other identical elements in such process, method, article or device.

The above are only specific implementations of the present disclosure, such that those skilled in the art can understand or implement the present disclosure. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, rather, should be defined by the broadest scope consistent with the principle and novel features disclosed herein.

The invention claimed is:

1. A method for searching for a clipping template, comprising:
    acquiring a first multimedia resource determined by a user; and
    searching a template database based on the first multimedia resource, to acquire a search result,
    wherein the search result is configured to indicate whether a target clipping template matching the first multimedia resource is searched out, and the target clipping template is configured to indicate to clip a to-be-clipped multimedia material into a second multimedia resource based on a target clipping mode,
    wherein searching the template database based on the first multimedia resource comprises:
    determining a candidate clipping template, based on a feature of the first multimedia resource in a target dimension and a feature of at least one clipping template in the target dimension, wherein the at least one clipping template comprises the candidate clipping template; and
    acquiring the search result, based on an identification result of the candidate clipping template in the target dimension, wherein the identification result of the candidate clipping template in the target dimension is obtained based on features of the first multimedia resource and the candidate clipping template in the target dimension; and
    wherein the determining the candidate clipping template comprises:
    determining a current dimension, based on a priority order of respective target dimensions;
    acquiring a first identification result for each clipping template in a first filtering result in the current dimension, based on a feature of the first multimedia resource in the current dimension and a feature of the first filtering result in the current dimension;
    acquiring a second filtering result corresponding to the current dimension, based on the first identification results and a filtering condition corresponding to the current dimension, wherein the second filtering result comprises: one or more clipping templates, and the first filtering result in an initial state comprises: the at least one clipping template;
    determining the second filtering result as the first filtering result; and
    returning to a process of determining the current dimension based on the priority order of the respective target dimensions, until a second filtering result corresponding to a last current dimension is acquired; and determining a clipping template included in the second filtering result corresponding to the last current dimension as the candidate clipping template.

2. The method according to claim 1, wherein the target dimension comprises: one or more of a music style dimension, an audio fingerprinting dimension, a video size dimension, a video segment feature dimension and a visual effect dimension.

3. The method according to claim 2, wherein the target dimension comprises: at least two of the music style dimension, the audio fingerprinting dimension, the video size dimension, the video segment feature dimension and the visual effect dimension;
    the acquiring the search result, based on the identification result of the candidate clipping template in the target dimension comprises:
    acquiring a weighted calculation result for the candidate clipping template, based on identification results of the candidate clipping template in respective target dimensions and weight coefficients corresponding to the respective target dimensions; and
    acquiring the search result, based on the weighted calculation result for the candidate clipping template.

4. The method according to claim 1, wherein the acquiring the first multimedia resource determined by the user comprises:
    acquiring a target link inputted by the user, and parsing the target link to acquire the first multimedia resource.

5. The method according to claim 1, further comprising: sending the search result to the user.

6. The method according to claim 5, further comprising: sending the target clipping template to the user, based on the search result.

7. An electronic device, comprising:
    a memory;

a processor; and a computer program wherein the memory is configured to store the computer program; and the processor is configured to execute the computer program, and the computer program, where executed by the processor, causes the processor to:

acquire a first multimedia resource determined by a user; and search a template database based on the first multimedia resource, to acquire a search result, wherein the search result is configured to indicate whether a target clipping template matching the first multimedia resource is searched out, and the target clipping template is configured to indicate to clip a to-be-clipped multimedia material into a second multimedia resource based on a target clipping mode, wherein the computer program, where executed by the processor, causes the processor to:

determine a candidate clipping template, based on a feature of the first multimedia resource in a target dimension and a feature of at least one clipping template in the target dimension, wherein the at least one clipping template comprises the candidate clipping template; and acquire the search result, based on an identification result of the candidate clipping template in the target dimension, wherein the identification result of the candidate clipping template in the target dimension is obtained based on features of the first multimedia resource and the candidate clipping template in the target dimension; and wherein the computer program, where executed by the processor, causes the processor to:

determine a current dimension, based on a priority order of respective target dimensions;

acquire a first identification result for each clipping template in a first filtering result in the current dimension, based on a feature of the first multimedia resource in the current dimension and a feature of the first filtering result in the current dimension;

acquire a second filtering result corresponding to the current dimension, based on the first identification results and a filtering condition corresponding to the current dimension, wherein the second filtering result comprises: one or more clipping templates, and the first filtering result in an initial state comprises: the at least one clipping template;

determine the second filtering result as the first filtering result; and return to a process of determining the current dimension based on the priority order of the respective target dimensions, until a second filtering result corresponding to a last current dimension is acquired; and determining a clipping template included in the second filtering result corresponding to the last current dimension as the candidate clipping template.

8. The electronic device according to claim 7, wherein the target dimension comprises: one or more of a music style dimension, an audio fingerprinting dimension, a video size dimension, a video segment feature dimension and a visual effect dimension.

9. The electronic device according to claim 8, wherein the target dimension comprises: at least two of the music style dimension, the audio fingerprinting dimension, the video size dimension, the video segment feature dimension and the visual effect dimension;

and wherein the computer program, where executed by the processor, causes the processor to:

acquire a weighted calculation result for the candidate clipping template, based on identification results of the candidate clipping template in respective target dimensions and weight coefficients corresponding to the respective target dimensions; and acquire the search result, based on the weighted calculation result for the candidate clipping template.

10. The electronic device according to claim 7, wherein the computer program, where executed by the processor, causes the processor to:

acquire a target link inputted by the user, and parse the target link to acquire the first multimedia resource.

11. A non-transitory computer-readable storage medium, comprising instructions stored thereon, wherein the instructions, when executed on an electronic device, cause the electronic device to:

acquire a first multimedia resource determined by a user; and search a template database based on the first multimedia resource, to acquire a search result, wherein the search result is configured to indicate whether a target clipping template matching the first multimedia resource is searched out, and the target clipping template is configured to indicate to clip a to-be-clipped multimedia material into a second multimedia resource based on a target clipping mode, wherein the instructions, when executed on an electronic device, cause the electronic device to:

determine a candidate clipping template, based on a feature of the first multimedia resource in a target dimension and a feature of at least one clipping template in the target dimension, wherein the at least one clipping template comprises the candidate clipping template; and acquire the search result, based on an identification result of the candidate clipping template in the target dimension, wherein the identification result of the candidate clipping template in the target dimension is obtained based on features of the first multimedia resource and the candidate clipping template in the target dimension; and wherein the instructions, when executed on an electronic device, cause the electronic device to:

determine a current dimension, based on a priority order of respective target dimensions;

acquire a first identification result for each clipping template in a first filtering result in the current dimension, based on a feature of the first multimedia resource in the current dimension and a feature of the first filtering result in the current dimension;

acquire a second filtering result corresponding to the current dimension, based on the first identification results and a filtering condition corresponding to the current dimension, wherein the second filtering result comprises: one or more clipping templates, and the first filtering result in an initial state comprises: the at least one clipping template;

determine the second filtering result as the first filtering result; and return to a process of determining the current dimension based on the priority order of the respective target dimensions, until a second filtering result corresponding to a last current dimension is acquired; and determining a clipping template included in the second filtering result corresponding to the last current dimension as the candidate clipping template.

\* \* \* \* \*